US012563250B2

(12) United States Patent
Atai et al.

(10) Patent No.: US 12,563,250 B2
(45) Date of Patent: Feb. 24, 2026

(54) METHODS AND APPARATUS TO GENERATE AUDIENCE METRICS FOR CONNECTED TELEVISION

(71) Applicant: The Nielsen Company (US), LLC, New York, NY (US)

(72) Inventors: Ameneh Atai, New York City, NY (US); Matan Bik, North Haven, CT (US); Utsav Utpal Vakil, Jersey City, NJ (US); Christopher Newell Sausman, Sawbridgeworth (GB); Jason Shun, Jersey City, NJ (US); Efrat Marom Markov, Netsach (IL)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 18/826,661

(22) Filed: Sep. 6, 2024

(65) Prior Publication Data

US 2024/0430509 A1      Dec. 26, 2024

Related U.S. Application Data

(63) Continuation of application No. 17/878,836, filed on Aug. 1, 2022, now Pat. No. 12,096,061.

(60) Provisional application No. 63/228,592, filed on Aug. 2, 2021.

(51) Int. Cl.
| | |
|---|---|
| *H04N 21/258* | (2011.01) |
| *H04N 21/24* | (2011.01) |
| *H04N 21/25* | (2011.01) |

(52) U.S. Cl.
CPC ................ *H04N 21/25883* (2013.01); *H04N 21/2407* (2013.01); *H04N 21/251* (2013.01)

(58) Field of Classification Search
CPC ......... H04N 21/25883; H04N 21/2407; H04N 21/251; H04N 21/2393; H04N 21/812; G06Q 30/0201; G06Q 30/0242
See application file for complete search history.

(56) References Cited

U.S. PATENT DOCUMENTS

| | | | | |
|---|---|---|---|---|
| 6,853,291 | B1 * | 2/2005 | Aisa ................. | H02J 13/00002 340/3.3 |
| 9,563,900 | B1 * | 2/2017 | Guo .................... | G06F 16/2322 |
| 11,405,689 | B2 * | 8/2022 | Garcia ................ | H04N 21/454 |
| 11,758,210 | B1 * | 9/2023 | Garib Herrera ..... | H04N 21/252 725/14 |

(Continued)

*Primary Examiner* — Timothy R Newlin

(57) ABSTRACT

Methods, apparatus, systems, and articles of manufacture are disclosed to generate audience metrics for connected television. An example system includes at least one memory, programmable circuitry, and instructions to cause the programmable circuitry to obtain media access data corresponding to connected television media and a user identifier corresponding to a media access device, generate, using a machine learning model, probability values for corresponding audience demographics in a household composition corresponding to the user identifier, the probability values indicative of likelihoods that corresponding ones of the audience demographics are accessing the connected television media, determine a person-level characteristic based on the probability values of the audience demographics, the person-level characteristic corresponding to an audience member of the connected television media, and assign the media access data to the person-level characteristic.

20 Claims, 9 Drawing Sheets

(56)                References Cited

U.S. PATENT DOCUMENTS

| | | | | |
|---|---|---|---|---|
| 2002/0083434 A1* | 6/2002 | Bacso | H04N 21/2365 | 348/E7.071 |
| 2003/0229893 A1* | 12/2003 | Sgaraglino | H04N 7/17318 | 348/E7.071 |
| 2005/0096978 A1* | 5/2005 | Black | H04N 7/17318 | 705/14.55 |
| 2006/0212900 A1* | 9/2006 | Ismail | H04N 21/44224 | 725/35 |
| 2006/0282851 A1* | 12/2006 | Errico | G06Q 10/10 | 348/E7.071 |
| 2007/0011039 A1* | 1/2007 | Oddo | G06Q 30/0201 | 705/7.33 |
| 2007/0282677 A1* | 12/2007 | Carpenter | G06Q 20/40145 | 705/14.3 |
| 2010/0037255 A1* | 2/2010 | Sheehan | H04N 7/17336 | 725/34 |
| 2010/0268840 A1* | 10/2010 | Hiie | H04L 63/065 | 709/244 |
| 2011/0265116 A1* | 10/2011 | Stern | H04N 21/6118 | 725/35 |
| 2012/0072940 A1* | 3/2012 | Fuhrer | H04N 21/25891 | 725/13 |
| 2012/0215903 A1* | 8/2012 | Fleischman | G06Q 50/01 | 709/224 |
| 2013/0254787 A1* | 9/2013 | Cox | H04N 21/252 | 725/13 |
| 2014/0237496 A1* | 8/2014 | Julian | G06Q 30/02 | 725/13 |
| 2014/0244566 A1* | 8/2014 | Hewett | G06Q 30/0242 | 706/52 |
| 2015/0032502 A1* | 1/2015 | Green | G06Q 20/203 | 705/7.29 |
| 2015/0081417 A1* | 3/2015 | Golden | G06Q 30/0269 | 705/14.41 |
| 2015/0189500 A1* | 7/2015 | Bosworth | G06F 21/6254 | 709/201 |
| 2015/0229979 A1* | 8/2015 | Wood | H04N 21/4663 | 725/14 |
| 2015/0262207 A1* | 9/2015 | Rao | G06Q 30/0241 | 705/7.32 |
| 2015/0370814 A1* | 12/2015 | Liodden | G06F 16/958 | 707/750 |
| 2016/0134934 A1* | 5/2016 | Jared | G06Q 30/0203 | 725/14 |
| 2016/0249098 A1* | 8/2016 | Pecjak | H04N 21/44224 | |
| 2018/0286000 A1* | 10/2018 | Berry, Jr. | G06Q 30/0269 | |
| 2018/0332140 A1* | 11/2018 | Bullock | H04L 67/53 | |
| 2019/0139075 A1* | 5/2019 | Cimino | G06F 16/90335 | |
| 2020/0058019 A1* | 2/2020 | Navin | G06Q 30/0201 | |
| 2021/0195260 A1* | 6/2021 | Major | H04N 21/47 | |
| 2021/0377611 A1* | 12/2021 | Bress | G06N 3/08 | |
| 2023/0403424 A1* | 12/2023 | Bates | H04N 21/4122 | |

* cited by examiner

200

OFFLINE FILES

<CLIENT_NAMES>_CTV_<TIMESTAMP>.CVS.GZ

PUBLISHER DATA DATASTORE

202

PUBLISHER

204

300

NEURAL NETWORK TRAINING

308

310    312

| PROBABILITY SCORE | DEMO |
|---|---|
| 0.098114 | F13-18 |
| 0.07137 | M13-18 |
| 0.198114 | M45-49 |
| 0.684215 | F34-45 |
| 0.212941 | F18-34 |

TABLE 1. HH COMPOSITION AND SCORES

302

TRUTH SET

306

304

PUBLISHER DATA

306

314

SCORING/THRESHOLDING    PREDICTION

500A 508    510    512

| PUBLISHER-ASSIGNED USER ID | MEDIA ACCESS DATA | | HOUSEHOLD ASSIGNMENT | | | | |
|---|---|---|---|---|---|---|---|
| | DAY PART | GENRE | PERSON | DEMO | HH SIZE | NUM_ADULTS | NUM_KIDS |
| ID1234 | PRIME TIME | SCI-FI | 1 | M21-24 | 2 | <=2 | 0 |
| | | | 2 | F21-24 | 2 | <=2 | 0 |

500B 514    516    518

| LIKELIHOOD | PRIMARY | SECONDARY |
|---|---|---|
| HIGH | MALE21-24 | N/A |
| LOW | FEMALE21-45 | N/A |

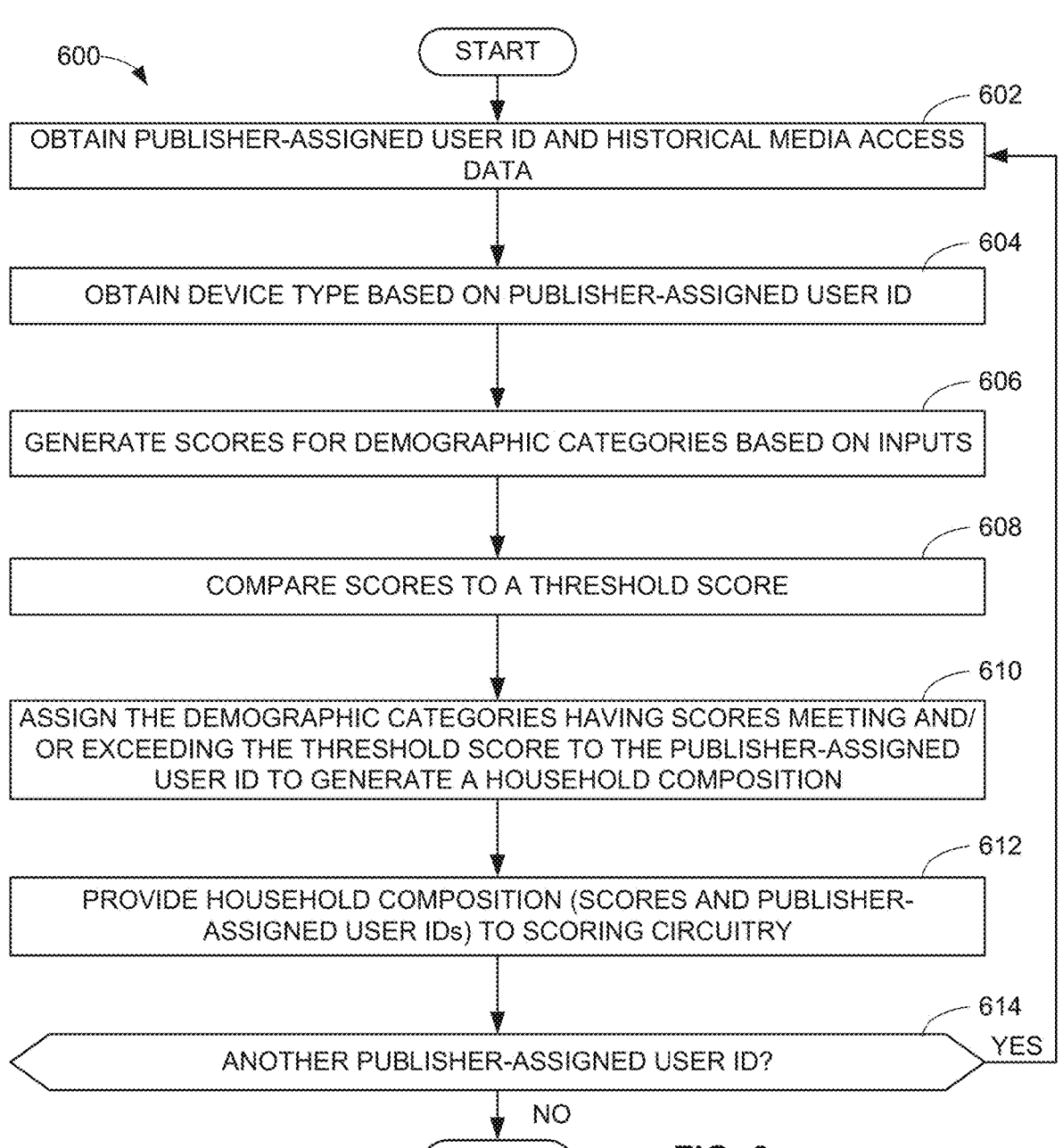

600

START

602
OBTAIN PUBLISHER-ASSIGNED USER ID AND HISTORICAL MEDIA ACCESS DATA

604
OBTAIN DEVICE TYPE BASED ON PUBLISHER-ASSIGNED USER ID

606
GENERATE SCORES FOR DEMOGRAPHIC CATEGORIES BASED ON INPUTS

608
COMPARE SCORES TO A THRESHOLD SCORE

610
ASSIGN THE DEMOGRAPHIC CATEGORIES HAVING SCORES MEETING AND/ OR EXCEEDING THE THRESHOLD SCORE TO THE PUBLISHER-ASSIGNED USER ID TO GENERATE A HOUSEHOLD COMPOSITION

612
PROVIDE HOUSEHOLD COMPOSITION (SCORES AND PUBLISHER-ASSIGNED USER IDs) TO SCORING CIRCUITRY

614
ANOTHER PUBLISHER-ASSIGNED USER ID?    YES

NO

END    FIG. 6

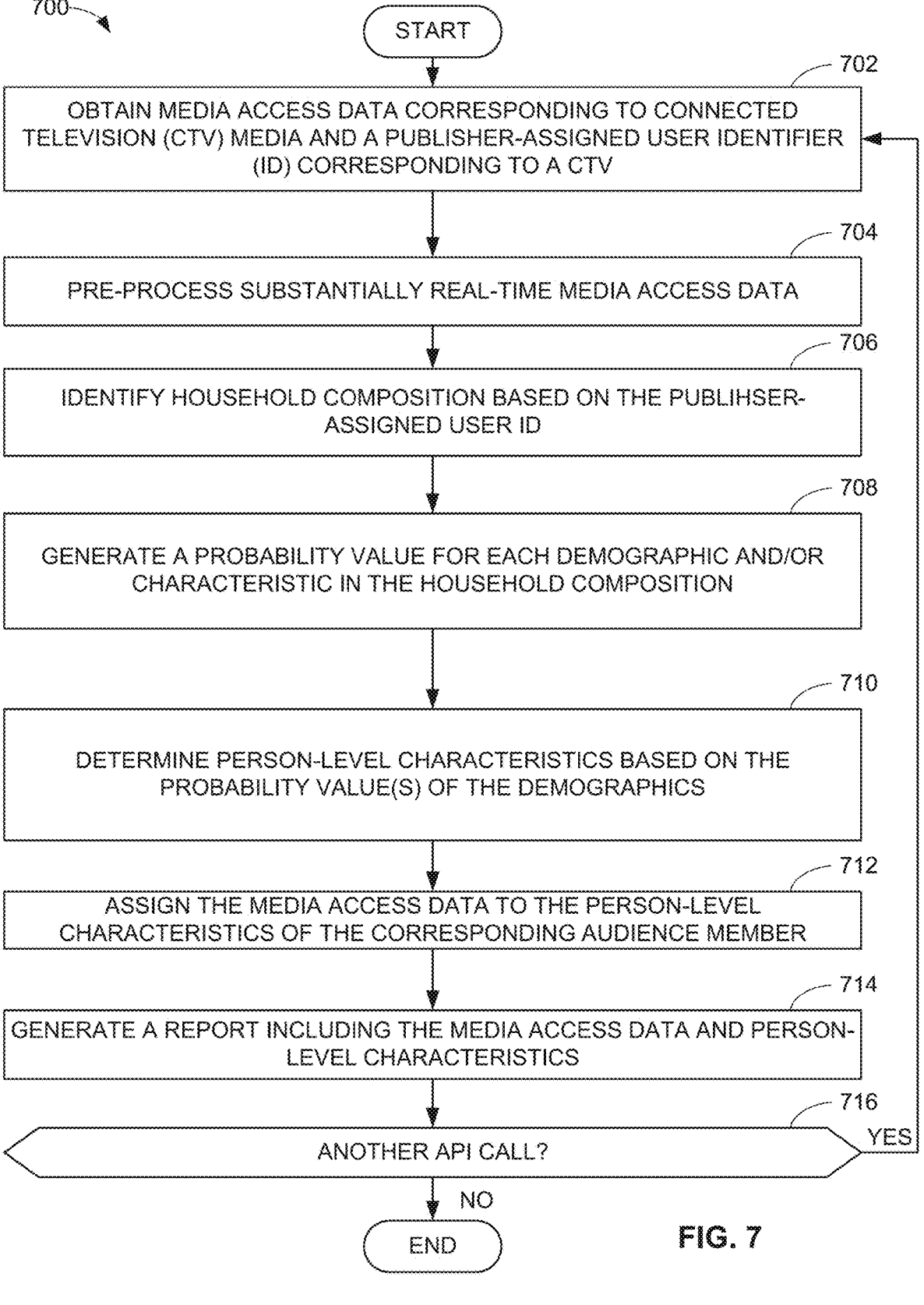

700

START

OBTAIN MEDIA ACCESS DATA CORRESPONDING TO CONNECTED TELEVISION (CTV) MEDIA AND A PUBLISHER-ASSIGNED USER IDENTIFIER (ID) CORRESPONDING TO A CTV — 702

PRE-PROCESS SUBSTANTIALLY REAL-TIME MEDIA ACCESS DATA — 704

IDENTIFY HOUSEHOLD COMPOSITION BASED ON THE PUBLIHSER-ASSIGNED USER ID — 706

GENERATE A PROBABILITY VALUE FOR EACH DEMOGRAPHIC AND/OR CHARACTERISTIC IN THE HOUSEHOLD COMPOSITION — 708

DETERMINE PERSON-LEVEL CHARACTERISTICS BASED ON THE PROBABILITY VALUE(S) OF THE DEMOGRAPHICS — 710

ASSIGN THE MEDIA ACCESS DATA TO THE PERSON-LEVEL CHARACTERISTICS OF THE CORRESPONDING AUDIENCE MEMBER — 712

GENERATE A REPORT INCLUDING THE MEDIA ACCESS DATA AND PERSON-LEVEL CHARACTERISTICS — 714

ANOTHER API CALL? — 716    YES

NO

END

FIG. 7

METHODS AND APPARATUS TO GENERATE AUDIENCE METRICS FOR CONNECTED TELEVISION

CROSS-REFERENCE TO RELATED APPLICATIONS

This patent is a continuation of U.S. patent application Ser. No. 17/878,836, now U.S. Pat. No. 12,096,061, filed on Aug. 1, 2022, which claims the benefit of U.S. Provisional Patent Application No. 63/228,592, which was filed on Aug. 2, 2021. U.S. patent application Ser. No. 17/878,836 and U.S. Provisional Patent Application No. 63/228,592 are hereby incorporated herein by reference in their entirety. Priority to U.S. patent application Ser. No. 17/878,836 and U.S. Provisional Patent Application No. 63/228,592 is hereby claimed.

FIELD OF THE DISCLOSURE

This disclosure relates generally to connected television and, more particularly, to methods and apparatus to generate audience metrics for connected television.

BACKGROUND

Connected Television (CTV) Advertising is advertising placed on any television (TV) that can be connected to the Internet. These TVs, also called Smart TVs, either directly access the Internet or do it via streaming devices. In some examples, CTV media can additionally or alternatively be accessed via personal computing devices (e.g., desktop computers), gaming platform devices (e.g., video gaming consoles), mobile computing/communication devices (e.g., smartphones, tablet devices, laptop computers, smartwatches, etc.), etc. In recent years, consumer attention has moved towards CTV as opposed to traditional TVs not connected to the Internet.

BRIEF DESCRIPTION OF THE DRAWINGS

FIG. 6 is a flowchart representative of example machine readable instructions and/or example operations that may be executed by example processor circuitry to implement the modeling circuitry of FIGS. 1 and 3 to determine household assignments and scoring parameters of FIG. 1.

FIG. 7 is a flowchart representative of example machine readable instructions and/or example operations that may be executed by example processor circuitry to implement the example demographic assignment circuitry of FIGS. 1 and 4 to identify demographic categories accessing connected television media in substantially real-time.

In general, the same reference numbers will be used throughout the drawing(s) and accompanying written description to refer to the same or like parts. The figures are not to scale.

Figure 1:
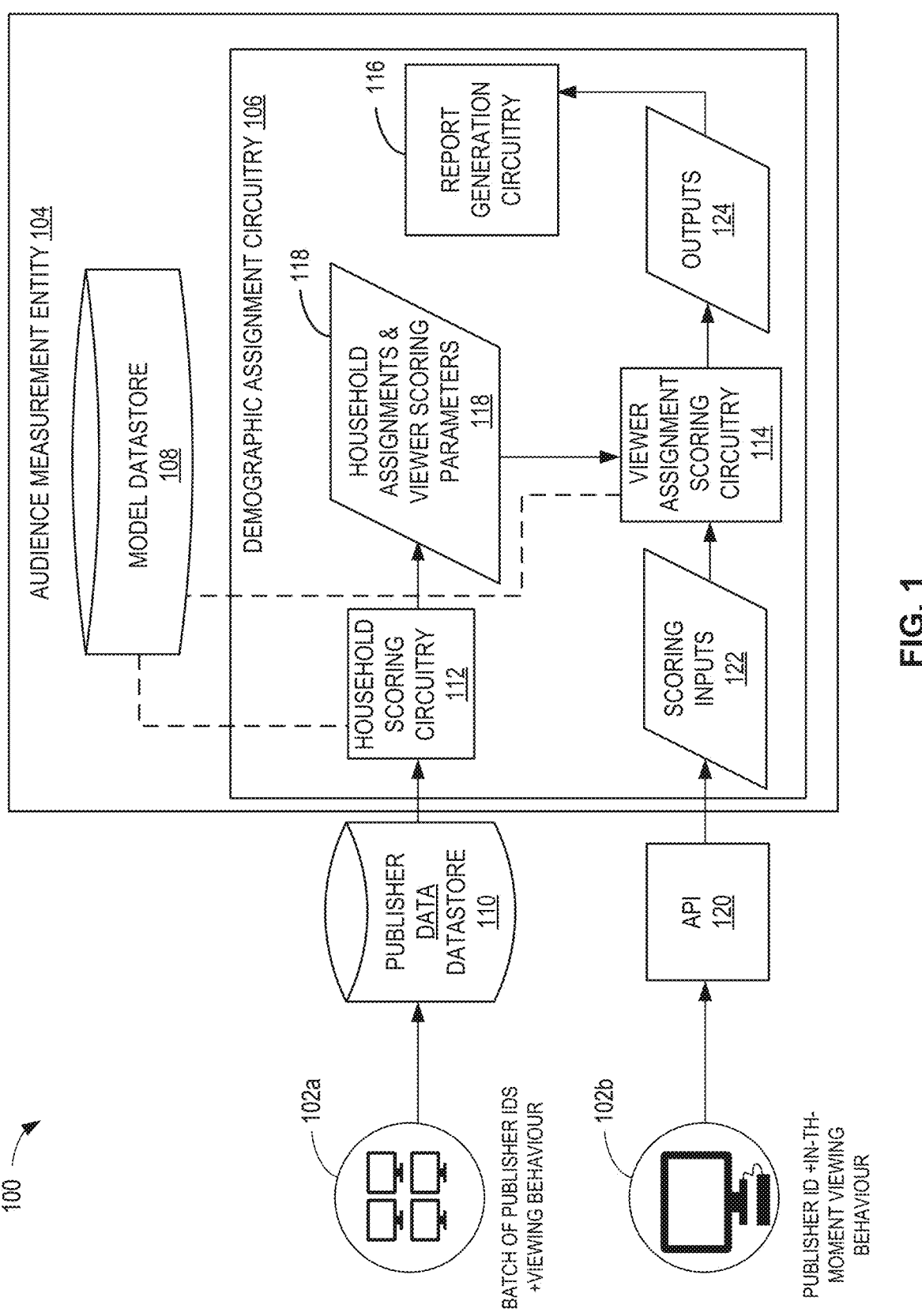
FIG. 1 is a block diagram of an example system to implement example demographic assignment circuitry for a connected television in accordance with examples disclosed herein.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description. As used herein "substantially real-time" refers to occurrence in a near instantaneous manner recognizing there may be real world delays for computing time, transmission, etc. Thus, unless otherwise specified, "substantially real-time" refers to being within a 1-second time frame.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

As consumer attention moves toward CTV, 59% of advertisers plan to increase CTV advertising (ad) spending. With the influx of advertising and limited inventory (e.g., a number of advertisements or an amount of ad space a publisher has available to sell to an advertiser), optimizing ad inventory is important for CTV partners to maximize yield on inventory and eliminate advertising waste. Close to one third of CTV advertising campaigns do not reach the intended audience, resulting in wasted ad dollars. For example, most advertising on CTV happens at the household-level. However, households are often made up of diverse audiences with different interests. For example, if Sons of Anarchy is being watched within a household, a 35-year-old male likely watching the show should be shown an automobile advertisement instead of a yogurt advertisement. However, the probability that the yogurt advertisement will be shown is higher than desired because advertising happens at the household-level.

Examples disclosed herein optimize CTV advertising to facilitate advertisers reaching the right audience. For example, examples disclosed herein utilize panelist information (e.g., panelist demographics) and CTV customer (e.g., publishers) viewing behavior of the clients devices (e.g., what people have watched and are currently watching (in-session)) to train at least one machine learning model and/or to build at least one data science model to provide (e.g., output) person-level demographic assignments to media access data (e.g., media played in-session, media viewed in-session, etc.). The at least one machine learning model and/or at least one data science model determines who is in the household based on historical media access data (e.g., CTV customer viewing behavior), panelist information, and/or third-party data provider information. As such, examples disclosed herein predict demographics of audience members before the advertising is placed. This enables customers to make better inventory optimization decisions in substantially real-time.

Examples disclosed herein provide demographics of viewers accessing media on a given device. Examples disclosed herein identify, from media panels, the relationship between viewing behavior and household and viewer demographics and consumption. Examples disclosed herein provide the missing link to predict, in substantially real-time, the audience of different media (e.g., movies, television programs, episodes, sporting event streams, etc.), and as a result, help customers drive the value of CTV inventory for their advertisers.

Examples disclosed herein may be implemented by an audience measurement entity (AME) service, where the service is to assign demographic information to the publisher's CTV inventory. To do this, examples disclosed herein utilize information provided by the customer to predict the demographics of the CTV viewer within the subscriber's household.

Examples disclosed herein include the ability to deliver the prediction of who is consuming (e.g., viewing, exposed to, etc.) media 'in-session', such that a publisher-assigned user ID is delivered to an AME service by a publisher, demographic information is assigned by the AME service, and then the publisher-assigned user ID and demographic information is returned back to the publisher by the AME service. In some examples, this prediction occurs while the audience member(s) is/are viewing and/or being exposed to the television media that shapes the prediction.

The prediction enables the customer to make better CTV inventory optimization decisions in substantially real-time. However as a consequence, there is an importance placed on data access methods (e.g., methods by which the AME service accesses the publisher-assigned user ID and the publisher accesses the demographic information). The publisher is to send CTV-related IDs before the in-session demographic assignment is made. For example, the publisher is to send the CTV-related IDs to the AME service offline in advance of the in-session demographic assignment because, if the publisher sends an ID in-session without having previously sent it, examples disclosed herein would not be able to make a substantially immediate viewer assignment prediction (e.g., a viewer assignment prediction in substantially real-time). However, after enough data is accrued for that CTV-related ID, examples disclosed herein can return a viewer assignment prediction. Subsequently, the customer (e.g., a publisher) is to send the ID to the AME service with the associated in-session tuning data using an application program interface while the subscriber is watching television media. In other words, the publisher-assigned user ID is sent to the AME service in substantially real-time. The AME service is to send the publisher-assigned user ID back to the publisher and/or customer, using the application programming interface, with the predicted demographic information of the viewer(s) watching and/or being exposed to the television media while the viewer(s) are in-session. In other words, the ID and predicted demographic information are sent back to the customer in substantially real-time.

FIG. 1 is a block diagram of an example system 100 to execute an example demographic assignment service (e.g., the AME service) for a connected television (CTV) advertisement provider, publisher, etc. The example system 100 implements the demographic assignment service to assign demographic information to a publisher's CTV inventory and connect demographic information to tuning information (e.g., media access behavior data). The example system 100 includes example publishers 102a and 102b, and an example audience measurement entity (AME) 104. The example AME 104 includes example demographic assignment circuitry 106, and an example model datastore 108. The example system 100 includes an example publisher data datastore 110 and an example application programming interface (API) 120. The example demographic assignment circuitry 106 includes example household scoring circuitry 112, example viewer assignment scoring circuitry 114, and example report generation circuitry 116.

In FIG. 1, the example publishers 102a, 102b are media publishers of CTV media, such as BBC iPlayer®, Amazon®, Netflix®, Sky®, Hulu®, Roku®, Samsung®, etc. Additionally and/or alternatively, the example publishers 102a, 102b may be manufacturers of CTV devices. The example publishers 102a, 102b include publisher-assigned user identifiers (IDs), such as numerical identifiers, character identifiers, etc. used to identify media access devices and/or audience members that use the media access devices. As used herein, a publisher-assigned user ID is a user and/or device identifier that corresponds to an audience member and is unique to the publisher. For example, a first publisher may create a user identifier as a publisher-assigned user ID for a subscriber (e.g., an audience member) of the first publisher. A second publisher may identify the audience member using a different publisher-assigned user ID generated by the second publisher. For example, the first publisher may generate a first publisher-assigned user ID for the audience member by generating a first hash value of an email address of the audience member. The second publisher may generate a second publisher-assigned user ID for the same audience member by generating a second hash value of the same email address. In such examples, the first hash value is different from the second hash value. Thus, the first and second publisher-assigned user IDs are different from one another. In some examples, the publisher-assigned user IDs may include device information or be based on device identifiers corresponding to devices of the audience members. The example publisher 102a provides publisher-assigned user identifiers to the example AME 104 and/or the household scoring circuitry 112 to facilitate assigning demographic information of the household members that access and/or use the CTV (e.g., media access device, computing device, etc.). In some examples, the publisher 102b provides publisher-assigned user IDs to the example AME 104 and/or the example viewer assignment scoring circuitry 114 for determining audience members for the publisher of the CTV media (e.g., the publisher 102b) and assigning demographics of the audience members to the CTV media.

The example publisher 102a includes historical media access behaviors. For example, the publisher 102a may include one or more records of media access data generated during previous media access sessions (e.g., determined by the publisher 102a and/or third parties). The example publisher 102a includes tuning data, such as broadcasting information, media channel information, etc. For example, the publisher 102a includes information corresponding to what media is being displayed and/or presented by a CTV at particular times.

In FIG. 1, the example AME 104 is an entity such as The Nielsen Company (US), LLC that monitors and/or reports exposure to media and operates as a neutral third-party relative to advertisers and the publisher. That is, in the illustrated example, the AME 104 does not provide media (e.g., content and/or advertisements) to end users. This un-involvement with media production and/or delivery ensures the neutral status of the AME 104 and, thus, enhances the trusted nature of the data the AME 104 collects and processes. The reports generated by the AME 104 identify aspects of media usage, such as the number of people who are watching live television programs and/or CTV media and characteristics of the audiences (e.g., demographic information of who is watching and/or being exposed to the live television programs and/or CTV media, when they are watching the programs, etc.).

The example AME 104 implements the demographic assignment circuitry 106 and the model datastore 108 to facilitate predicting and assigning demographics to media presented via a CTV and/or a CTV device (e.g., a CTV mobile device). The demographic assignment circuitry 106 of FIG. 1 may be instantiated (e.g., creating an instance of, bring into being for any length of time, materialize, implement, etc.) by processor circuitry such as a central processing unit executing instructions. Additionally or alternatively, the demographic assignment circuitry 106 of FIG. 1 may be instantiated (e.g., creating an instance of, bring into being for any length of time, materialize, implement, etc.) by an ASIC or an FPGA structured to perform operations corresponding to the instructions. It should be understood that some or all of the demographic assignment circuitry 106 of FIG. 1 may, thus, be instantiated at the same or different times. Some or all of the demographic assignment circuitry 106 may be instantiated, for example, in one or more threads executing concurrently on hardware and/or in series on hardware. Moreover, in some examples, some or all of the demographic assignment circuitry 106 of FIG. 1 may be implemented by microprocessor circuitry executing instructions to implement one or more virtual machines and/or containers.

In FIG. 1, the example demographic assignment circuitry 106 includes the example household scoring circuitry 112 to receive and/or obtain a batch of publisher-assigned user IDs, historical media access data, and third-party data (when third-party data is available) from the example publisher 102a and/or the publisher data datastore 110 in an offline manner to assign household compositions to publisher-assigned user IDs. For example, the household scoring circuitry 112 obtains the publisher-assigned user IDs and historical media access data prior to a substantially real-time operation of the demographic assignment service. The example household scoring circuitry 112 is implemented by media measurement models. For example, the household scoring circuitry 112 may be implemented by a machine learning model that has been trained to predict demographics based on historical media access data. In this example, the household scoring circuitry 112 obtains the trained machine learning model from the model datastore 108.

In some examples, the batch of publisher-assigned user IDs and historical media access data are provided to set up the system 100 for executing the demographic assignment service. For example, the household scoring circuitry 112 identifies categories of demographics corresponding to a household (e.g., who lives in a household) and assigns those categories to the publisher-assigned user IDs. Such a household assignment enables the system 100 to execute the demographic assignment service in substantially real-time. For example, the household scoring circuitry 112 determines demographics of a household having and/or implementing a CTV device. As described above, households can include many demographic categories, such as but not limited to, adult females, adult males, teenage females, teenage males, age buckets, etc. The household scoring circuitry 112 utilizes the historical media access data, as well as any available third-party data, to predict the demographic categories for a household associated with the publisher-assigned user ID.

To predict the demographic categories for a household, the example household scoring circuitry 112 obtains household or device-level information from the example publisher 102a. For example, the publisher-assigned user IDs may be mapped to subscriber information (e.g., name, date of birth, residence, etc.) that is accessible by the household scoring circuitry 112. In some examples, the household scoring circuitry 112 compares the historical media access data to a truth set of media access data corresponding to panelists. As used herein, a panelist is a person, selected by a monitoring company, who agrees to have their media access activities monitored. In some examples, a household of panelists agree to comply with the monitoring companies. In such an example, the monitoring companies request and/or obtain demographics of the panelists, such as age, gender, marital status, race, ethnicity, income, etc. Additionally, the monitoring companies obtain and/or measure media access behavior of the panelists and assign the media access behavior to the panelist demographics. In such an example, the household scoring circuitry 112 can compare the known panelist media access behavior to the historical media access behavior and make a prediction of what demographics are associated with the historical media access behavior.

In some examples, the household scoring circuitry 112 implements models (e.g., machine learning models) that were previously trained with third-party data. The third-party data may be used as additional input data to assist the modeling of the household scoring circuitry 112. In some examples, the additional input data is provided by third parties, such as database proprietors. For example, a third-party database proprietor may have demographic information corresponding to the household associated with the publisher-assigned user ID. For example, the AME 104 (FIG. 1) may be partnered with a third-party provider. Such a partnership enables the example AME 104 to receive and/or request demographic information from the third-party provider in response to a publisher-assigned user ID corresponding to that third-party provider. In some examples, the third-party data may improve an accuracy of the model when predicting demographic compositions based on media access data.

The example household scoring circuitry 112 utilizes the publisher-assigned user IDs and the historical media access behavior to determine household assignments and viewer scoring parameters 118. To determine household assignments, the example household scoring circuitry 112 selects a publisher-assigned user ID and associated media access behavior data (e.g., previous CTV media presented by a media access device) and generates predictions for demographic categories (e.g., male ages 25-30, female ages 25-30, etc.). The example household scoring circuitry 112 implements a model from the example model datastore 108 that utilizes rules from a known dataset (e.g., rules generated based on media access data corresponding to a known panel dataset) and applies them to the unknown, selected media access behavior data. The example household scoring circuitry 112 identifies a score (e.g., a viewer scoring parameter 118) for demographic categories based on applying the rules to the unknown media access behavior data. The example household scoring circuitry 112 links the historical media access behavior to the scores (e.g., the viewer scoring parameters 118). The viewer scoring parameters 118 (e.g., scores) are numerical values assigned to a publisher-assigned user ID that are indicative of a probability that the publisher-assigned user ID corresponds to a particular demographic category. For example, the household scoring circuitry 112 generates one or more scores for each demographic category, wherein a high score indicates a high probability that a demographic category is associated with the publisher-assigned user ID and a low score indicates a low probability that the demographic category is associated with the publisher-assigned user ID. For example, the household scoring circuitry 112 determines, based on the historical media access data, that there is a 90% chance that a 25-30 year old male is in the household and is associated with the publisher-assigned user ID. In some examples, the household scoring circuitry 112 determines that there is an 80% chance that a 25-30 year old female is in the household and is associated with the publisher-assigned user ID. In some examples, the household scoring circuitry 112 determines that there is a 5% chance that an 8-10 year old male is in the household and, therefore, is not associated with the publisher-assigned user ID.

In the example of FIG. 1, the household scoring circuitry 112 provides the viewer scoring parameters 118 to the example viewer assignment scoring circuitry 114. The example viewer assignment scoring circuitry 114 may utilize the household assignments and scoring parameters 118 to identify a demographic category for media served in substantially real-time. The example household scoring circuitry 112 is described in further detail below in connection with FIG. 3.

In some examples, the household scoring circuitry 112 includes means for determining a household composition. For example, the means for determining a household composition may be implemented by the household scoring circuitry 112. In some examples, the household scoring circuitry 112 may be instantiated by processor circuitry such as the example processor circuitry 812 of FIG. 8. For instance, the household scoring circuitry 112 may be instantiated by the example microprocessor 900 of FIG. 9 executing machine executable instructions such as those implemented by at least blocks 602, 604, 606, 608, 610, 612, 614 of FIG. 6. In some examples, the household scoring circuitry 112 may be instantiated by hardware logic circuitry, which may be implemented by an ASIC, XPU, or the FPGA circuitry 1000 of FIG. 10 structured to perform operations corresponding to the machine readable instructions. Additionally or alternatively, the household scoring circuitry 112 may be instantiated by any other combination of hardware, software, and/or firmware. For example, the household scoring circuitry 112 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the means for determining includes means for determining demographic categories to generate the household compositions. In some examples, the means for determining includes means for determining scores for demographic categories.

In FIG. 1, the example demographic assignment circuitry 106 includes the example viewer assignment scoring circuitry 114 to identify a demographic category for media served in substantially real-time and assign that demographic category to the media. The example viewer assignment scoring circuitry 114 utilizes the scoring parameters 118, determined by the household scoring circuitry 112, and in-the-moment media access behavior data to predict which household member is being exposed to media in substantially real-time. The example viewer assignment scoring circuitry 114 is utilized in substantially real-time (e.g., in-session), when media is being served to audience members in substantially real-time.

In some examples, the viewer assignment scoring circuitry 114 is implemented by a scoring engine that utilizes pre-determined rules and the scoring parameters 118 to generate scores for each of the demographic categories associated with input data (e.g., the publisher-assigned user ID and in-the-moment media access behavior data). In some examples, the viewer assignment scoring circuitry 114 is includes a data science model. In some examples, the viewer assignment scoring circuitry 114 includes a machine learning model that utilizes pre-determined weights (e.g., the scoring parameters 118) to predict a demographic category associated with example scoring inputs 122 (e.g., input data such as the publisher-assigned user ID and in-the-moment media access behavior data). The example viewer assignment scoring circuitry 114 obtains and/or is provided with such a model and/or scoring engine from the example model datastore 108. The example viewer assignment scoring circuitry 114 generates example outputs 124, including the scores (e.g., probabilities, likelihoods, etc.), for each of the demographic categories associated with the example scoring inputs 122. The example outputs 124 are described in further detail below in connection with FIG. 5B. In some examples, the viewer assignment scoring circuitry 114 is instantiated by processor circuitry executing the viewer assignment scoring circuitry 114 instructions and/or configured to perform operations such as those represented by the flowchart of FIG. 7.

In the example of FIG. 1, the viewer assignment scoring circuitry 114 obtains, via an API call, a publisher-assigned user ID and current media access behavior data. In some examples, the viewer assignment scoring circuitry 114 determines and/or identifies the scores linked to the publisher-assigned user ID. The example viewer assignment scoring circuitry 114 applies rules, weights, and/or parameters to the current media access behavior data, where the rules, weights, and/or parameters are associated with demographic categories having the highest scores. For example, a first publisher-assigned user ID is linked to a first score corresponding to a first demographic category, a second score corresponding to a second demographic category, and a third score corresponding to a third demographic category. In this example, the first score is 90%, the second score is 95%, and the third score is 5%. The example viewer assignment scoring circuitry 114 may thus utilize rules, weights, and/or parameters associated with the first demographic category and the second demographic category to determine which demographic category between the two is being exposed to and/or has accessed the media in substantially real-time, and not utilize the rules, weights, and/or parameters associated with the third demographic category. For example, because there is a low likelihood that the third demographic category is in the household corresponding to the publisher-assigned user ID, the viewer assignment scoring circuitry 114 does not waste computation cycles, processing power, etc., on the third demographic category while analyzing the current media access behavior data. Additionally and/or alternatively, the example household assignments and viewer scoring parameters 118 associate the publisher-assigned user ID with only the demographic categories that have the highest scores. In such an example, the viewer assignment scoring circuitry 114 does not need to identify and/or discard the demographic categories that have low scores.

In some examples, the viewer assignment scoring circuitry 114 includes means for generating probabilities of audience demographics in substantially real-time. For example, the means for generating probabilities of audience demographics in substantially real-time may be implemented by the viewer assignment scoring circuitry 114. In some examples, the viewer assignment scoring circuitry 114 may be instantiated by processor circuitry such as the example processor circuitry 812 of FIG. 8. For instance, the viewer assignment scoring circuitry 114 may be instantiated by the example microprocessor 900 of FIG. 9 executing machine executable instructions such as those implemented by at least blocks 704, 706, 708, 710, of FIG. 7. In some examples, the viewer assignment scoring circuitry 114 may be instantiated by hardware logic circuitry, which may be implemented by an ASIC, XPU, or the FPGA circuitry 1000 of FIG. 10 structured to perform operations corresponding to the machine readable instructions. Additionally or alternatively, the viewer assignment scoring circuitry 114 may be instantiated by any other combination of hardware, software, and/or firmware. For example, the viewer assignment scoring circuitry 114 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the means for generating includes means for determining person-level characteristics based on the probabilities.

In FIG. 1, the example report generation circuitry 116 generates reports including predicted audience metrics (e.g., demographic categories) for the substantially real-time media being served. The example report generation circuitry 116 is in communication with advertisers (e.g., advertising companies, etc.) to provide in-session audience metrics before an ad is served. In some examples, the report generation circuitry 116 is in communication with CTV publishers (e.g., the publisher 102a), via an API (e.g., API 120) who provide the report of in-session audience metrics to the advertisers. In some examples, the report generation circuitry 116 generates a signal indicative of the audience member(s) who accessed the media. In some examples, the signal is indicative of what audience member(s) is/are most likely to have accessed the media. In some examples, the report generation circuitry 116 is provided with information regarding client preferences on how to generate the reports. For example, the report generation circuitry 116 may receive instructions on what type of demographic categories the client (e.g., advertiser) prefers (e.g., combined: 'Male 18-25,' 'Female 18-34'), what should be returned when there is insufficient information on the publisher-assigned user ID to return a demographic assignment, etc.

In FIG. 1, the example report generation circuitry 116 assigns a media access to an audience member demographic corresponding to a highest probability in the household. For example, the report generation circuitry 116 obtains, from the viewer assignment scoring circuitry 114, person-level characteristics (e.g., age and gender) corresponding to the audience member that most likely accessed the media. As such, the example report generation circuitry 116 maps (e.g., links, associates, etc.) the current media access data from the example publisher 102b with the predicted person-level characteristics from the example viewer assignment scoring circuitry 114. In some examples, the report generation circuitry 116 utilizes this mapping to generate the reports.

In some examples, the report generation circuitry 116 includes means for generating a report including person level characteristics. For example, the means for generating a report may be implemented by the report generation circuitry 116. In some examples, the report generation circuitry 116 may be instantiated by processor circuitry such as the example processor circuitry 812 of FIG. 8. For instance, the report generation circuitry 116 may be instantiated by the example microprocessor 900 of FIG. 9 executing machine executable instructions such as those implemented by at least block 712 of FIG. 7. In some examples, the report generation circuitry 116 may be instantiated by hardware logic circuitry, which may be implemented by an ASIC, XPU, or the FPGA circuitry 1000 of FIG. 10 structured to perform operations corresponding to the machine readable instructions. Additionally or alternatively, the report generation circuitry 116 may be instantiated by any other combination of hardware, software, and/or firmware. For example, the report generation circuitry 116 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In FIG. 1, the example AME 104 includes the model datastore 108 to store trained models. For example, the model datastore 108 stores machine learning models that have been trained to identify household compositions and/or that have been trained to assign person-level characteristics to media access data. In some examples, the model datastore 108 can be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The model datastore 108 can additionally or alternatively be implemented by one or more double data rate (DDR) memories, such as DDR, DDR2, DDR3, DDR4, mobile DDR (mDDR), etc. The model datastore 108 can additionally or alternatively be implemented by one or more mass storage devices such as hard disk drive(s), compact disk drive(s), digital versatile disk drive(s), solid-state disk drive(s), etc. While in the illustrated example the model datastore 108 is illustrated as a single datastore, the model datastore 108 can be implemented by any number and/or type(s) of datastores. Furthermore, the data stored in the model datastore 108 can be in any data format such as, for example, binary data, comma delimited data, tab delimited data, structured query language (SQL) structures, etc.

In FIG. 1, the example system 100 includes the example publisher data datastore 110 to store publisher-assigned user IDs and previous (e.g., historical) media access behavior data. In the illustrated example, the publisher data datastore 110 is a cloud storage resource, generated by the AME 104, and provided to the publisher 102a to store publisher-assigned user IDs and previous media access behavior data. For example, the publisher data datastore 110 may be an Amazon Web Services (AWS) Simple Storage Service (S3) generated specifically for the publisher 102a. In some examples, the AME 104 generates any number of publisher assigned datastores depending on the number of publishers that utilize the demographic assignment service. For example, the AME 104 may generate a publisher assigned datastore for each publisher. In some examples, the AME 104 may generate one or more publisher assigned datastores for the publishers 102a, 102b. For example, the AME 104 generates multiple publisher assigned datastores for a publisher.

In some examples, the AME 104 may generate the publisher data datastore 110 by sending a datastore resource provisioning request to a resource provisioning service (e.g., in an enterprise computing environment, in a cloud service environment, etc.). The example AME 104 establishes credentials for the publisher data datastore 110 that are only accessible by the publisher 102a. For example, if the AME 104 generates multiple publisher assigned datastores 110, the AME 104 creates multiple unique credentials, where each unique credential enables an approved publisher to access (e.g., store data in) the publisher assigned datastore. Additionally, the credentials will enable the demographic assignment circuitry 106 and/or the household scoring circuitry 112 to access (e.g., retrieve data from) the publisher data datastore 110.

In FIG. 1, the example system 100 includes an API 120 to receive requests, to assign person-level characteristics to publisher-assigned user IDs, from the example publisher 102b. The example API 120 obtains substantially real-time (e.g., in-session) calls from the example publisher 102b before an ad is served. For example, the API 120 obtains publisher-assigned user IDs and substantially real-time (e.g., in-session) media data (e.g., current media access behavior data) from the publisher 102b. As used herein, media data is data indicative of what is being played and/or output by the CTV and/or computing device. For example, media data may be information associated with media identification. The example API 120 provides the data from the substantially real-time calls as example scoring inputs 122 to the example viewer assignment scoring circuitry 114. For example, the API 120 may input the data (e.g., publisher-assigned user IDs, media access data, etc.) to the viewer assignment scoring circuitry 114. The example scoring inputs 122 are described in further detail below in connection with FIG. 5A. In some examples, the API 120 is instantiated by processor circuitry executing API 120 instructions and/or configured to perform operations such as those represented by the flowchart of FIG. 7.

In some examples, the API 120 includes means for obtaining calls and/or notifications. For example, the means for obtaining calls and/or notifications may be implemented by the API 120. In some examples, the API 120 may be instantiated by processor circuitry such as the example processor circuitry 812 of FIG. 8. For instance, the API 120 may be instantiated by the example microprocessor 900 of FIG. 9 executing machine executable instructions such as those implemented by at least blocks 702, 714 of FIG. 7. In some examples, the API 120 may be instantiated by hardware logic circuitry, which may be implemented by an ASIC, XPU, or the FPGA circuitry 1000 of FIG. 10 structured to perform operations corresponding to the machine readable instructions. Additionally or alternatively, the API 120 may be instantiated by any other combination of hardware, software, and/or firmware. For example, the API 120 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

Figure 2:
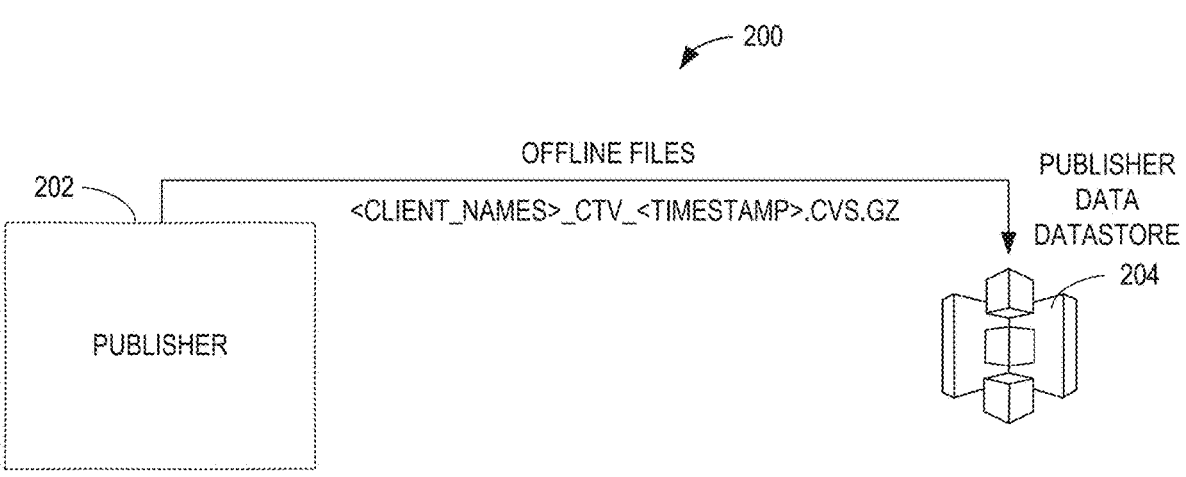
FIG. 2 is an example first implementation of the demographic assignment circuitry of FIG. 1 to obtain publisher-assigned user identifiers and historical data offline.
Figure 3:
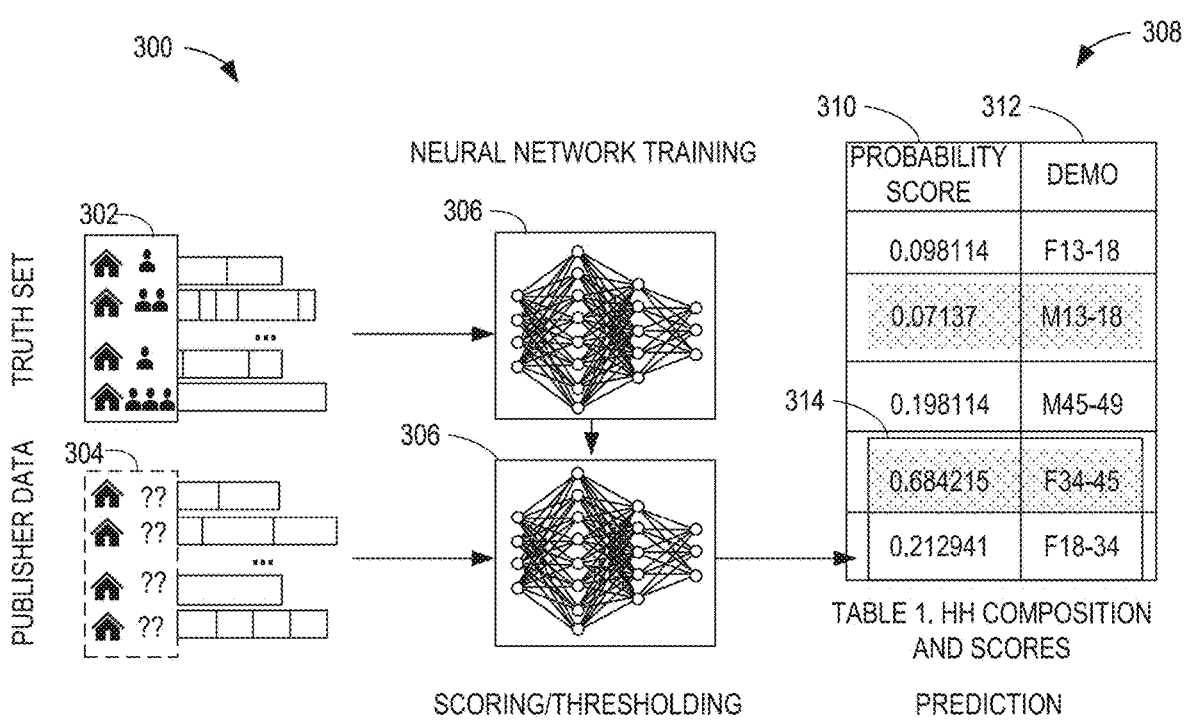
FIG. 3 is an example implementation of modeling circuitry of the system of FIG. 1 to generate household compositions for publisher-assigned user identifiers.
Figure 4:
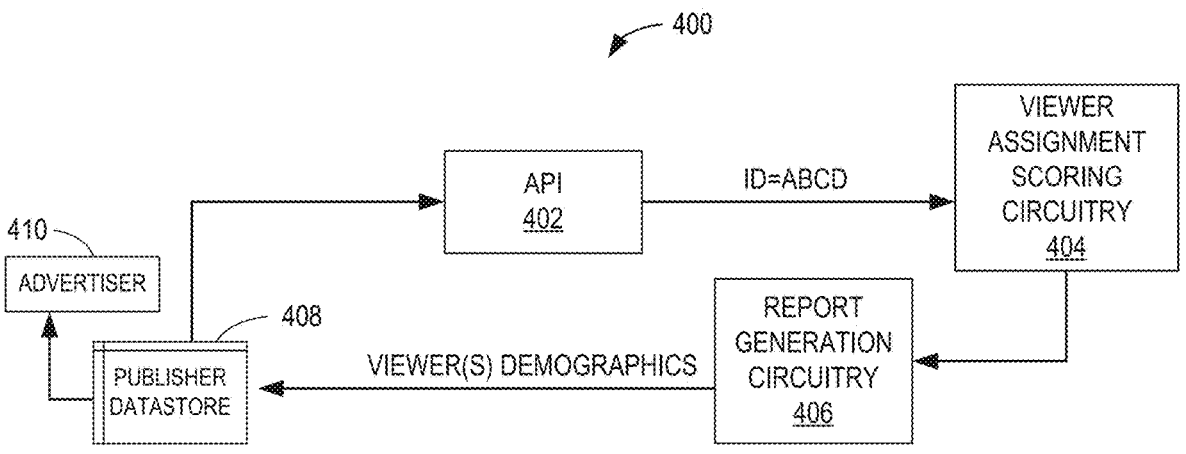
FIG. 4 is an example second implementation of the demographic assignment circuitry of FIG. 1 to predict audience members of connected television media in substantially real-time.

In an example first operation of the demographic assignment circuitry 106, the demographic assignment circuitry 106 generates household assignments and viewer scoring parameters 118 based on data obtained offline (e.g., not in substantially real-time when media is being served). In an example second operation of the demographic assignment circuitry 106, the demographic assignment circuitry 106 assigns users and corresponding demographics to media served in substantially real-time. FIGS. 2 and 3 describe example first implementations of the demographic assignment circuitry 106 (FIG. 1) operating in an offline manner in further detail below, where the first implementations correspond to the first operation of the demographic assignment circuitry 106. FIG. 4 describes an example second implementation of the demographic assignment circuitry 106 operating in substantially real-time in further detail below, where the second implementation corresponds to the second operation of the demographic assignment circuitry 106. In a combined operation of the demographic assignment circuitry 106: 1) obtains publisher-assigned user IDs and previous (e.g., historical) media access behavior data, offline (e.g., not in real-time), to determine scoring parameters and assign household demographics (e.g., household composition(s)) to publisher-assigned user IDs, 2) obtains publisher-assigned user IDs and substantially real-time (e.g., in-session) media access behavior data, 3) predicts audience members (e.g., demographic categories) that are being exposed to the substantially real-time media access data, and 4) provides predictions of the audience members to advertisers for serving targeted advertisements to the audience.

FIG. 2 is an example first implementation 200 of the demographic assignment circuitry 106 (FIG. 1) to obtain publisher-assigned user IDs and historical data offline (e.g., not in real-time). The example first implementation 200 is executed by and includes an example publisher 202 and an example publisher data datastore 204. The example publisher 202 may be implemented by the publisher 102a of FIG. 1. The example publisher data datastore 204 may be implemented by the example publisher data datastore 110 of FIG. 1.

In the example first implementation 200 of the system 100, the example publisher data datastore 204 obtains a publisher-assigned user ID and historical media access data on a regular, but not real-time, cadence (e.g., every 30 days). The example publisher data datastore 204 obtains files (e.g., comma-separated values (CSV) file, etc.) with publisher-assigned user IDs, along with a number of days (e.g., 14-30, 100 days, etc.) of historical media access data (e.g., historical CTV media viewing behavior). In some examples, the files can be zipped if they are large (e.g., above a threshold of bytes), but are to be uniform across all the files. For example, the files must be of the same type (CSV, tab-separated values (TSV) file, web page (HTML), etc.). Data fields in the files are to be pipe delimited. As used herein, a pipe delimited file is a file that includes data fields separated by a special character called a "pipe" (e.g., data field 1|data field 2). In some examples, the files including publisher-assigned user IDs and historical media access data can be delimited in any manner, such as by comma, tab, etc. In examples disclosed herein, the publisher 202 is to follow a file naming structure. In some examples, the file naming structure is flexible but is to be verified by the demographic assignment circuitry 106 (e.g., <customer_name>_CTV_<timestamp>.csv.gz).

In the example first implementation 200, the files including publisher-assigned user IDs and historical media access data are to be stored at the publisher data datastore 204. The data stored in the example publisher data datastore 204 is to be fed into the household scoring circuitry 112.

FIG. 3 is an example modeling implementation 300 of the household scoring circuitry 112 (FIG. 1) to generate household compositions for publisher-assigned user identifiers. The example modeling implementation 300 illustrated in FIG. 3 depicts training models, implemented by the household scoring circuitry 112, and generating the household (HH) assignments (e.g., household compositions) and viewer scoring parameters 118. The example modeling implementation 300 includes an example truth dataset 302, an example publisher dataset 304, an example model 306, and an example table 308.

In FIG. 3, the example modeling implementation 300 includes the example truth dataset 302 to train the example model 306 to predict HH compositions. The example truth dataset 302 may include annotations and/or metadata that tells the model 306 what to output. For example, the truth dataset 302 is a panel dataset including at least one household with known demographics and known historical media access data. For example, the truth dataset 302 includes known demographic categories in a first HH, known demographic categories in a second HH, known demographic categories in a third HH, and known demographic categories in a fourth HH. The example truth dataset 302 includes relationships between the known demographic categories and particular media access behavior data. For example, the truth dataset 302 includes a relationship between a first demographic category in the first HH and a particular tuning station (e.g., Home Box Office (HBO™), Entertainment and Sports Programming Network (ESPN®), etc.). In some examples, the truth dataset 302 includes a similar relationship between a first demographic category in the second HH and the particular tuning station. The example truth dataset 302 is used as an input to the example model 306 to train the example model 306 to identify demographic categories based on historical media access behavior data.

In FIG. 3, the example modeling implementation 300 includes the example publisher dataset 304 to be input into the example trained model 308. The example publisher dataset 304 includes publisher-assigned user IDs and historical media access data corresponding to those publisher assigned user IDs. In some examples, each publisher-assigned user ID corresponds to a HH. For example, the publisher dataset 304 includes a fifth HH, a sixth HH, a seventh HH, and an eighth HH all having unknown demographic categories. In this example, the fifth HH corresponds to a first publisher-assigned user ID, the sixth HH corresponds to a second publisher-assigned user ID, the seventh HH corresponds to a third publisher-assigned user ID, and the eighth HH corresponds to a fourth publisher-assigned user ID. In some examples, the publisher dataset 304 includes device types corresponding to the publisher-assigned user IDs. In some examples, the publisher assigned datastore (e.g., publisher data datastore 110 of FIG. 1 and/or publisher data datastore 204 of FIG. 2) stores the publisher dataset 304.

In FIG. 3, the example modeling implementation 300 includes the example model 306 to predict HH compositions and generate scores (e.g., viewer scoring parameters). The example model 306 is trained with the example truth dataset 302 and stored in the example model datastore 108 (FIG. 1). The example model 306 is implemented by the household scoring circuitry 112 (FIG. 1) to generate a HH composition for each of the publisher-assigned user IDs in the publisher dataset 304. The example model 306 is implemented by the household scoring circuitry 112 to generate scores 118 for each of the publisher-assigned user IDs. In some examples, the model 306 is a machine learning model. Additionally and/or alternatively, the model 306 is a scoring engine, a data science model, etc. In this example, the model 306 is implemented by a neural network. However, the example model 306 may be implemented by any type of machine learning model algorithm and/or technique, such as Random Forest, Nearest Neighbors, Decision Trees, etc.

In FIG. 3, the example modeling implementation 300 includes the example table 308, which includes a first column 310, a second column 312, and a HH composition 314. The example first column 310 includes scores and the example second column 312 includes demographic categories.

In some examples, the publisher providing the publisher dataset 304 identifies and/or specifies which demographic categories are to be scored by the model 306. For example, in Table 1, the demographic categories to be scored include female ages 13-18, male ages 13-18, male ages 45-49, female ages 34-45, and female ages 18-34. Therefore, the example model 306 generates a score for each one of the demographic categories, where the score is indicative of a likelihood that a corresponding demographic category is in the household corresponding to the publisher-assigned user ID.

In FIG. 3, the model 306 identifies the HH composition of, for example, the fifth HH by comparing the scores to a threshold score. In some examples, the threshold score is indicative of a lowest likelihood that a demographic category is in a corresponding HH. For example, a threshold score of 0.2 may be defined, and any score that does not meet or exceed 0.2 is not included in the HH composition 314. In FIG. 3, the HH composition 314 includes female ages 34-45 and female ages 18-34. In some examples, the model 306 compares the scores to example universe targets to determine if the HH composition satisfies a demographic distribution of a region under analysis (e.g., the United States of America or any other country, state, territory, or region of interest).

FIG. 4 is an example second implementation 400 of the system 100 (FIG. 1) to predict audience members of connected television media in substantially real-time and assign person-level characteristics to the CTV media. The example second implementation 400 is executed by and includes an example application programming interface (API) 402, example viewer assignment scoring circuitry 404, example report generation circuitry 406, an example publisher 408, and an example advertiser 410. In some examples, the API 402 is implemented by the API 120 of FIG. 1. Additionally and/or alternatively, the API 402 may be implemented by any API executed by a computer (e.g., a server). In some examples, the viewer assignment scoring circuitry 404 is implemented by the viewer assignment scoring circuitry 114 of FIG. 1. Additionally and/or alternatively, the viewer assignment scoring circuitry 404 may be implemented by any processor circuitry operating at the AME 104. In some examples, the report generation circuitry 406 is implemented by the report generation circuitry 116 of FIG. 1. Additionally and/or alternatively, the report generation circuitry 406 may be implemented by any processor circuitry operating at the AME 104. In some examples, the publisher 408 may be implemented by the publisher 102*b* of FIG. 1. Additionally and/or alternatively, the example publisher 408 may be any publisher.

In the example second implementation 400, the API 402 obtains substantially real-time (e.g., in-session) calls from the example CTV publisher 408 before an ad is served. For example, the API 402 obtains publisher-assigned user IDs and substantially real-time (e.g., in-session) media data (e.g., current media access behavior data) from the example publisher 408. In some examples, the publisher 408 makes calls to the API 402 utilizing an HTTP GET request with a CTV publisher defined ID and current in-session TV viewing behavior logs. Additionally and/or alternatively, the publisher 408 may make calls to the API 402 utilizing a different type of request. In some examples, a substantially real-time call, made to the API 402, may include a specific format, such as https://loadus.exelator.com/load/?p=123&g=1&ppid=publisherID. In some examples, the API 402 obtains device type information and a session ID in addition to the publisher-assigned user ID and the substantially real-time media data.

In the example second implementation 400, the viewer assignment scoring circuitry 404 obtains the publisher-assigned user ID and media data (e.g., current media access behavior data) from the API 402. The example viewer assignment scoring circuitry 404 is to score demographic categories mapped to the publisher-assigned user ID and identify person-level characteristics of audience members based on those scores. For example, the viewer assignment scoring circuitry 404 predicts which demographic category is exposed to and/or currently viewing the media indicated in the media data almost immediately (e.g., in substantially real-time), before the ad is served. The example viewer assignment scoring circuitry 404 provides the predicted demographics (e.g., personal level characteristics) to report generation circuitry 406 (e.g., report generation circuitry 116 of FIG. 1) so that the report generation circuitry 406 can format a response (e.g., a message) to the example publisher 408. The example report generation circuitry 406 is to format the response based on a preference of the publisher 408. In some examples, if the publisher 408 does not identify a preference, report generation circuitry 406 generates the response in a default format, such as a JSON body.

In the example second implementation 400, the example advertiser 410 is an entity that pays the example publisher 408 for advertising space to target a particular audience for their respective product. In some examples, the publisher 408 provides the demographic information to the advertiser 410 and a plurality of other advertisers, and the advertisers can bid for the CTV advertising space. For example, a particular demographic may be a target audience for more than one advertiser. The example publisher 408 may understand and/or acknowledge that the demographic is a popular or desired or intended demographic and provide a report to a plurality of advertisers, including the advertiser 410. Additionally and/or alternatively, the example publisher 408 may acknowledge and/or understand that the demographic is a targeted audience for a particular advertiser (e.g., advertiser 410) and directly inform them, rather than a plurality of advertisers, that their advertisement would reach their targeted demographic during the current session. In some examples, the advertiser 410 utilizes the response from the report generation circuitry 406 to determine whether to request the publisher 408 to publish their advertisement.

Figure 5A:
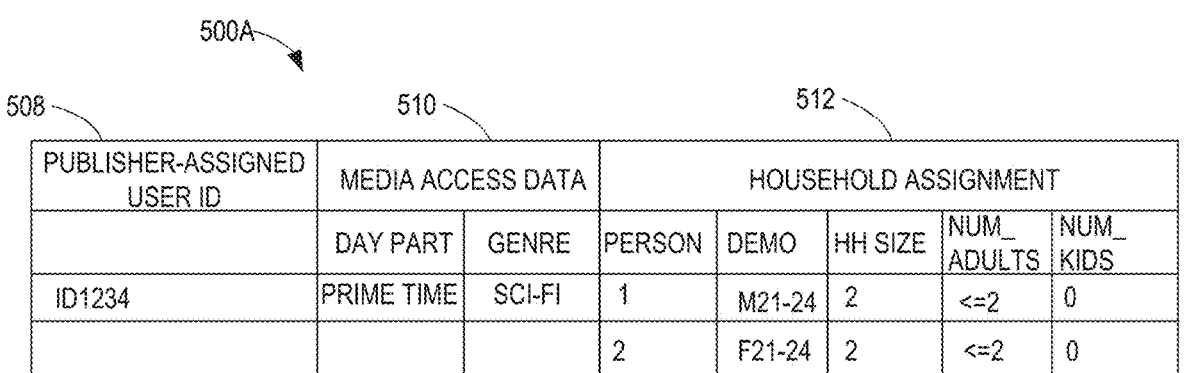
FIGS. 5A and 5B are example inputs and outputs of the example demographic assignment circuitry of FIG. 1 to predict audience demographics in substantially real-time for connected television media.
Figure 5B:
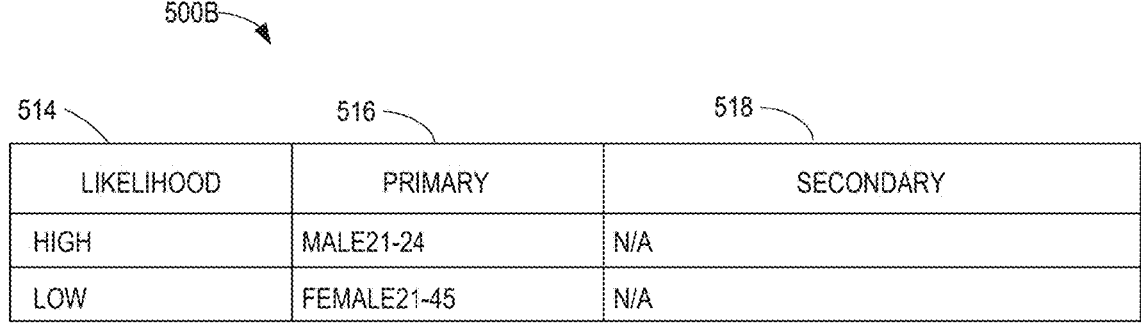

FIGS. 5A and 5B are example first and second tables 500A and 500B depicting example scoring inputs and example outputs. The first table 500A of FIG. 5A depicts the example scoring inputs and second table 500B of FIG. 5B depicts the example outputs.

FIG. 5A includes the example first table 500A which depicts the example scoring inputs that are provided to the example viewer assignment scoring circuitry (e.g., the viewer assignment scoring circuitry 114 of FIG. 1 and/or the viewer assignment scoring circuitry 404 of FIG. 4) to determine and/or predict audience metrics for a given CTV at a given time. In some examples, the scoring inputs are the scoring inputs 122 of FIG. 1.

The example first table 500A includes a first column 508, a second column 510, and third column 512. The first column 508 is representative of publisher-assigned user IDs. In some examples, the publisher-assigned user IDs correspond to audience members and/or devices of audience members. For example, when a publisher-assigned user ID corresponds to a mobile phone, device-level information may be provided for the user of the mobile phone. Device-level information may include a mobile device identifier tied to a user (e.g., a user associated with an Apple® identifier for an iPhone™, etc.). Additionally and/or alternatively, the publisher-assigned user ID corresponds to household-level information. For example, when a publisher-assigned user ID corresponds to a connected TV or smart TV (e.g., a television connected to media publishers via the Internet), household-level information may be provided as user information for all the users who have accounts with the publisher. In some examples, a publisher (e.g., the publishers 102a, 102b, the publisher 202, the publisher 408, etc.) provides the publisher-assigned user ID to the viewer assignment scoring circuitry (e.g., the viewer assignment scoring circuitry 114 of FIG. 1 and/or the viewer assignment scoring circuitry 404 of FIG. 4).

In FIG. 5A, the example second column 510 is representative of media access behavior data. The media access behavior data is media data indicative of media accessed in association with a publisher-assigned user ID. As used herein, the media access behavior data, media access data, media data, and CTV media are used interchangeably and refer to program name(s), genre information, format, rating, language, etc. In some examples, the media access behavior data is based on whatever information the publisher (e.g., the publishers 102a, 102b, the publisher 202, the publisher 408, etc.) provides. In this example, the media access data of the second column 510 includes day part information and genre information. As used herein, a day part is a block or part of a broadcast television day that has specific characteristics related to programming and viewer demographics (e.g., specific ages and/or genders are associated with specific day parts). As used herein, genre information is information corresponding to a category that a television program and/or media might fall into.

In FIG. 5A, the example third column 512 is representative of household assignments. Example household assignments include person identifiers, demographics, household size, number of adults, and number of kids. In this example, the person identifiers are numerical values distinguishing one person in the household from another. In this example, the demographics are person-level characteristics, assigned by the household scoring circuitry 112 of FIG. 1, and include an age bucket (e.g., 21-24 years old) and a gender (e.g., male (M) or female (F)). In this example, the household size is indicative of a number of people determined to be in the household and associated with the publisher-assigned user ID. In this example, the number of adults are indicative of how many people in the household are equal to and/or above the age of 18 years old. In this example, the number of kids are indicative of how many people in the household are less than the age of 18 years old and/or less than some other pre-determined age. In some examples, the data in the third column 512 is provided by the household scoring circuitry 112 of FIG. 1 and corresponds to the household assignments and viewer scoring parameters 118 of FIG. 1.

In some examples, the scoring inputs are inputs to a machine learning model. For example, the viewer assignment scoring circuitry 114 of FIG. 1 and/or the example viewer assignment scoring circuitry 404 of FIG. 4 is implemented by a ML model, trained based on historical media access behavior data, that predicts demographics based on the media access behavior data and the publisher-assigned user IDs. The example viewer assignment scoring circuitry 114 of FIG. 1 and/or the example viewer assignment scoring circuitry 404 of FIG. 4 may generate the example outputs in response to obtaining the scoring inputs from a publisher (e.g., the publisher 102b of FIG. 1, the publisher 202 of FIG.

2, and/or the publisher 408 of FIG. 4) and from household scoring circuitry (e.g., the household scoring circuitry 112 of FIG. 1).

In some examples, the scoring inputs are inputs to a scoring engine or a data science model. For example, the viewer assignment scoring circuitry 114 of FIG. 1 and/or the viewer assignment scoring circuitry 404 of FIG. 5 may be implemented by a scoring engine that predicts a score based on the scoring inputs of the first table 500A.

FIG. 5B includes the example second table 500B which depicts the example outputs that are generated by scoring circuitry (e.g., the viewer assignment scoring circuitry 114 of FIG. 1 and/or the viewer assignment scoring circuitry 404 of FIG. 4). The example second table 500B includes an example first column 516, an example second column 516, and an example third column 518. In some examples, the outputs of the second table 500B are the outputs 124 of FIG. 1.

In FIG. 5B, the example first column 514 is representative of a likelihood. For example, the first column 514 includes a high likelihood corresponding to a high probability that a certain demographic accessed the media access data and a low likelihood corresponding to a low probability that a certain demographic access the media access. In some examples, the likelihoods of the first column 514 may be represented by a numerical value corresponding to a probability. In some examples, the first column 514 may include more than two types of likelihoods. For example, the first column 514 may include a very high probability, a high probability, a low probability, a very low probability, etc.

In FIG. 5B, the example second column 516 is representative of example primary model outputs. In this example, primary model outputs are indicative of person level characteristics. For example, the primary model outputs include age(s) and gender(s) of audience members. The example primary model outputs correspond to a prediction about the audience members who accessed media presented by the CTV and published by the publisher (e.g., the publisher 102b of FIG. 1, the publisher 202 of FIG. 2, and the publisher 408 of FIG. 4). In some examples, the primary model outputs identify who accessed media in substantially real-time. For example, if the primary model outputs are associated with a high likelihood, then the primary model outputs identify an audience member that accessed the media access data. In this example, the second column 516 includes the demographics associated with the household assignments in the scoring inputs of the first table 500A. For example, the viewer assignment scoring circuitry generates likelihoods for the demographics included in the HH assignments.

In some examples, the viewer assignment scoring circuitry (e.g., viewer assignment scoring circuitry 114 of FIG. 1 and/or viewer assignment scoring circuitry 404 of FIG. 4) generates the primary model outputs by applying rules and parameters to the scoring inputs of the first table 500A. For example, based on the attributes of what media is being served in substantially real-time, the viewer assignment scoring circuitry (e.g., the viewer assignment scoring circuitry 114 of FIG. 1 and/or the viewer assignment scoring circuitry 404 of FIG. 4) applies rules and parameters that select which one of the household members in the household composition is positively associated with that media. In an example operation of the viewer assignment scoring circuitry (e.g., the viewer assignment scoring circuitry 114 of FIG. 1 and/or the viewer assignment scoring circuitry 404 of FIG. 4), the publisher-assigned user ID (ID1234) is associated with and/or linked to a household composition including a first demographic category corresponding to male 21-24 years old and a second demographic category corresponding to female 21-24 years old. In the example operation, the media included in the current media access behavior data is identified as being a day part of the science fiction genre. In the example operation, the scoring circuitry (e.g., the viewer assignment scoring circuitry 114 of FIG. 1 and/or the viewer assignment scoring circuitry 404 of FIG. 4) determines that the media access behavior data is positively associated with male viewership. The example scoring circuitry (e.g., the viewer assignment scoring circuitry 114 of FIG. 1 and/or the viewer assignment scoring circuitry 404 of FIG. 4) therefore selects the first demographic category and generates a score indicative that the first demographic category (e.g., male age 21-24) accessed the media.

In FIG. 5B, the example third column 518 is representative of example secondary model outputs. In this example, the secondary model outputs which are indicative of household-level characteristics. For example, the secondary model outputs includes origin(s) (e.g., country of birth, etc.), language(s) (e.g., primary language of the audience members), race(s), income(s), etc., of the audience members who accessed media presented by the CTV and published by the publisher (e.g., the publisher 102b of FIG. 1, the publisher 202 of FIG. 2, and the publisher 408 of FIG. 4). The secondary model outputs correspond to additional predictions, with respect to the primary model outputs, about the audience members who accessed media presented by the CTV.

In some examples, the viewer assignment scoring circuitry (e.g., viewer assignment scoring circuitry 114 of FIG. 1 and/or viewer assignment scoring circuitry 404 of FIG. 4) generates the secondary model outputs when the household composition associated with the publisher-assigned user ID includes sufficient data. For example, if the household scoring circuitry 112 (FIG. 1) generates a household composition that includes demographic categories of only age and gender, then the viewer assignment scoring circuitry (e.g., the viewer assignment scoring circuitry 114 of FIG. 1 and/or the viewer assignment scoring circuitry 404 of FIG. 4) may not generate secondary model outputs. In other examples, if the household scoring circuitry 112 generates a household composition that includes demographic categories of age, gender, origin(s), language(s), race(s), income(s), etc., then the scoring circuitry (e.g., viewer assignment scoring circuitry 114 of FIG. 1 and/or viewer assignment scoring circuitry 404 of FIG. 4) may generate the secondary model outputs.

The example outputs of the example second table 500B are utilized by publishers and/or advertisers to deliver audience specific (e.g., targeted) advertisements. Advantageously, the example scoring circuitry (e.g., the viewer assignment scoring circuitry 114 of FIG. 1 and/or the viewer assignment scoring circuitry 404 of FIG. 4) optimizes the decisions made by advertisers who wish to advertise products and goods to audience members that are interested in buying those products and goods.

While an example manner of implementing the AME 104 of FIG. 1 is illustrated in FIGS. 2, 3, 4, 5A, and 5B, one or more of the elements, processes, and/or devices illustrated in FIGS. 2, 3, 4, 5A, and 5B may be combined, divided, re-arranged, omitted, eliminated, and/or implemented in any other way. Further, the example demographic assignment circuitry 106, the example model datastore 108, the example household scoring circuitry 112, the example viewer assignment scoring circuitry 114, the example report generation circuitry 116, the example model 306, the example viewer assignment scoring circuitry 404, the example report generation circuitry 406, and/or, more generally, the example AME 104 of FIG. 1, may be implemented by hardware alone or by hardware in combination with software and/or firmware. Thus, for example, any of the example demographic assignment circuitry 106, the example model datastore 108, the example household scoring circuitry 112, the example viewer assignment scoring circuitry 114, the example report generation circuitry 116, the example model 306, the example viewer assignment scoring circuitry 404, the example report generation circuitry 406 and/or, more generally, the example AME 104, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example AME 104 of FIG. 1 may include one or more elements, processes, and/or devices in addition to, or instead of, those illustrated in FIGS. 2, 3, 4, 5A and 5B, and/or may include more than one of any or all of the illustrated elements, processes and devices.

Flowcharts representative of example machine readable instructions, which may be executed to configure processor circuitry to implement the AME 104 of FIGS. 2, 3, 4, 5A and 5B are shown in FIGS. 6 and 7. The machine readable instructions may be one or more executable programs or portion(s) of an executable program for execution by processor circuitry, such as the processor circuitry 812 shown in the example processor platform 800 discussed below in connection with FIG. 8 and/or the example processor circuitry discussed below in connection with FIGS. 9 and/or 10. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 6 and 7, many other methods of implementing the example AME 104 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example operations of FIGS. 6 and 7 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 6 is a flowchart representative of example machine readable instructions and/or example operations 600 that may be executed and/or instantiated by processor circuitry to determine household compositions and scoring parameters 118 (FIG. 1). The machine readable instructions and/or the operations 600 of FIG. 6 begin at block 602, at which the example household scoring circuitry 112 obtains a publisher-assigned user ID and historical media access data. For example, the publisher (e.g., the publisher 102a of FIG. 1 and/or the publisher 202 of FIG. 2) stores a batch of publisher data (e.g., the publisher dataset 304 of FIG. 3) in the publisher assigned datastore (e.g., the publisher data datastore 110 of FIG. 1 and/or the publisher data datastore 204 of FIG. 2) and the household scoring circuitry 112 retrieves a publisher-assigned user ID and historical media access data from the publisher assigned datastore (e.g., the publisher data datastore 110 of FIG. 1 and/or the publisher data datastore 204 of FIG. 2).

The example household scoring circuitry 112 obtains device type based on the publisher-assigned user ID (block 604). For example, the publisher (e.g., the publisher 102a of FIG. 1 and/or the publisher 202 of FIG. 2) stores a device type associated with the publisher-assigned user ID in the publisher assigned datastore (e.g., the publisher data datastore 110 of FIG. 1 and/or the publisher data datastore 204 of FIG. 2). The device type corresponds to a media access device that presented the historical media access data. In some examples, the device type indicates to the household scoring circuitry 112 whether the device is a single user device (e.g., a cell phone, a smart phone, etc.) or a household device (e.g., a smart TV, a desktop, etc.).

The example household scoring circuitry 112 generates scores for demographic categories based on the inputs (block 606). For example, the household scoring circuitry 112 determines a probability for each demographic category, where the probability corresponds to the likelihood that the demographic category is associated with the publisher-assigned user ID. The example household scoring circuitry 112 implements a neural network that determines the probability for each demographic category.

The example household scoring circuitry 112 compares the scores to a threshold score (block 608). For example, a pre-determined threshold score is utilized to provide the household scoring circuitry 112 with a minimum score that is indicative of a lowest likelihood that a demographic category is in a corresponding HH.

The example household scoring circuitry 112 assigns the demographic categories having scores meeting and/or exceeding the threshold score to the publisher-assigned user ID to generate a household composition (block 610). For example, the household scoring circuitry 112 may generate household composition information for the publisher-assigned user ID and map the household composition to the publisher-assigned user ID. The example household scoring circuitry 112 can assign the scores satisfying (e.g., meeting and/or exceeding) the threshold score in any manner.

The example household scoring circuitry 112 provides the household composition (scores and publisher-assigned user IDs) to the example viewer assignment scoring circuitry 114 (FIG. 1) (block 612). For example, the household scoring circuitry 112 provides the viewer assignment scoring circuitry 114 with parameters (e.g., household composition) that indicate how the viewer assignment scoring circuitry 114 is to process substantially real-time input data (e.g., substantially real-time media access behavior data). For example, the household composition informs the viewer assignment scoring circuitry 114 that when the corresponding publisher-assigned user ID is obtained, only identify which demographic category(ies) in the household composition is most likely accessing the media.

The example household scoring circuitry 112 determines whether there is another publisher-assigned user ID (block 614). For example, the household scoring circuitry 112 determines household compositions and scores for a batch of publisher-assigned user IDs provided by the publisher (e.g., the publisher 102a of FIG. 1 and/or the publisher 202 of FIG. 2). The example household scoring circuitry 112 obtains the publisher-assigned user IDs from the example publisher assigned datastore (e.g., publisher data datastore 110 of FIG. 1 and/or publisher data datastore 204 of FIG. 2).

In some examples, if the household scoring circuitry 112 determines there is another publisher-assigned user ID, control returns to block 602. For example, the household scoring circuitry 112 obtains the next publisher-assigned user ID from the publisher assigned datastore and determines the household composition for that publisher-assigned user ID.

In some examples, if the household scoring circuitry 112 determines there is not another publisher-assigned user ID, the operations 600 end. The example operations 600 may be repeated when a publisher (e.g., the publisher 102a of FIG. 1 and/or the publisher 202 of FIG. 2) provides a batch of and/or a single publisher-assigned user ID and corresponding historical media access data.

FIG. 7 is a flowchart representative of example machine readable instructions and/or example operations 700 that may be executed and/or instantiated by processor circuitry to identify who is accessing, being exposed to, and/or viewing CTV media in substantially real-time. The machine readable instructions and/or the operations 700 of FIG. 7 begin at block 702, at which the API (e.g., the API 120 of FIG. 1 and/or the API 402 of FIG. 4) obtains media access data corresponding to connected television (CTV) media and a publisher-assigned user ID corresponding to a CTV. For example, the API (e.g., the API 120 of FIG. 1 and/or the API 402 of FIG. 4) obtains an API call including a publisher-assigned user ID and substantially real-time media access data. In some examples, the publisher (e.g., the publisher 102b of FIG. 1 and/or the publisher 408 of FIG. 4) makes calls to the API (e.g., API 120 of FIG. 1 and/or the API 402 of FIG. 4) utilizing an HTTP GET request with a CTV publisher defined ID and current in-session TV viewing behavior logs. Additionally and/or alternatively, the publisher (e.g., the publisher 102b of FIG. 1 and/or the publisher 408 of FIG. 4) may make calls to the API (e.g., API 120 of FIG. 1 and/or the API 402 of FIG. 4) utilizing a different type of request.

The example viewer assignment scoring circuitry (e.g., the viewer assignment scoring circuitry 114 of FIG. 1 and/or the viewer assignment scoring circuitry 404 of FIG. 4) pre-processes substantially real-time media access data (block 704). For example, the viewer assignment scoring circuitry (e.g., the viewer assignment scoring circuitry 114 of FIG. 1 and/or the viewer assignment scoring circuitry 404 of FIG. 4) obtains the substantially real-time media access data from the API (e.g., the API 120 of FIG. 1 and/or the API 402 of FIG. 4) and prepares the data for modeling. For example, the viewer assignment scoring circuitry (e.g., the viewer assignment scoring circuitry 114 of FIG. 1 and/or the viewer assignment scoring circuitry 404 of FIG. 4) pre-processes media data into a format that is readable by the machine learning model, data science model, scoring engine, etc. In some examples, the viewer assignment scoring circuitry (e.g., the viewer assignment scoring circuitry 114 of FIG. 1 and/or the viewer assignment scoring circuitry 404 of FIG. 4) extracts features of the media data corresponding to media titles, media genres, etc., to prepare the media data for modeling. For example, the viewer assignment scoring circuitry (e.g., the viewer assignment scoring circuitry 114 of FIG. 1 and/or the viewer assignment scoring circuitry 404 of FIG. 4) may utilize filters, learned over time, that can be used to extract features of media data.

The example scoring circuitry (e.g., the viewer assignment scoring circuitry 114 of FIG. 1 and/or the viewer assignment scoring circuitry 404 of FIG. 4) identifies a household composition based on the publisher-assigned user ID (block 706). For example, the viewer assignment scoring circuitry (e.g., the viewer assignment scoring circuitry 114 of FIG. 1 and/or the viewer assignment scoring circuitry 404 of FIG. 4) identifies which demographic categories (e.g., male ages 14-20, female ages 14-20, male ages 24-30, female ages 24-30, etc.) are mapped to the publisher-assigned user ID.

The example scoring circuitry (e.g., the viewer assignment scoring circuitry 114 of FIG. 1 and/or the viewer assignment scoring circuitry 404 of FIG. 4) generates a probability value for each demographic and/or characteristic in the household composition (block 708). In the illustrated example, the probability value is a likelihood that the demographic and/or characteristic is accessing the media included in the substantially real-time media access data. For example, the viewer assignment scoring circuitry (e.g., the viewer assignment scoring circuitry 114 of FIG. 1 and/or the viewer assignment scoring circuitry 404 of FIG. 4) may generate a probability value indicative of a likelihood that the raw data received (e.g., the substantially real-time media access data) is positively related to one or more demographic categories by utilizing a model that is trained. For example, the probability value may be a numeric value between the numbers zero and one, in which the smallest value of zero represents a prediction or likelihood that the demographic category is not accessing the media included in the substantially real-time media access data. The example viewer assignment scoring circuitry includes a machine learning model that generates the probability values for each demographic in the household.

The example viewer assignment scoring circuitry (e.g., the viewer assignment scoring circuitry 114 of FIG. 1 and/or the viewer assignment scoring circuitry 404 of FIG. 4) determines person-level characteristics based on the probability value(s) of the demographics (block 710). In the illustrated example, the person-level characteristics correspond to an audience member of the CTV media. For example, the viewer assignment scoring circuitry (e.g., the viewer assignment scoring circuitry 114 of FIG. 1 and/or the viewer assignment scoring circuitry 404 of FIG. 4) uses the probability value(s) to identify person-level characteristics corresponding to one or more persons (e.g., in a HH) with the highest probability value(s). In some examples, the viewer assignment scoring circuitry (e.g., the viewer assignment scoring circuitry 114 of FIG. 1 and/or the viewer assignment scoring circuitry 404 of FIG. 4) generates an inference (e.g., a conclusion, a classification, a deduction, etc.), in substantially real-time, of what type of demographic category (e.g., male ages 14-20, female ages 14-20, male ages 24-30, female ages 24-30, etc.) is accessing the media and uses the inference to determine the person-level characteristics in substantially real-time at block 710. For example, the inference can indicate in substantially real-time if a male and/or a female is accessing media, what age range the male and/or the female is in, and any additional characteristics of a person.

The example report generation circuitry (e.g., the report generation circuitry 116 of FIG. 1 and/or the report generation circuitry 406 of FIG. 4) assigns the media access data to the person-level characteristics of the corresponding audience member (block 712). For example, the report generation circuitry (e.g., the report generation circuitry 116 of FIG. 1 and/or the report generation circuitry 406 of FIG. 4) obtains the person-level characteristics (e.g., age and gender) from the viewer assignment scoring circuitry (e.g., the viewer assignment scoring circuitry 114 of FIG. 1 and/or the viewer assignment scoring circuitry 404 of FIG. 4) and maps the person-level characteristics of the corresponding audience member to the substantially real-time media access data.

The example report generation circuitry (e.g., the report generation circuitry 116 of FIG. 1 and/or the report generation circuitry 406 of FIG. 4) generates a report including the media access data and the person-level characteristics (block 714). For example, the report generation circuitry (e.g., the report generation circuitry 116 of FIG. 1 and/or the report generation circuitry 406 of FIG. 4) is to format a response (e.g., a message) to an example publisher (e.g., the publisher 102*b* of FIG. 1 and/or the publisher 408 of FIG. 4). The example report generation circuitry (e.g., the report generation circuitry 116 of FIG. 1 and/or the report generation circuitry 406 of FIG. 4) is to format the response based on a preference of the publisher (e.g., the publisher 102*b* of FIG. 1 and/or the publisher 408 of FIG. 4). In some examples, if the publisher (e.g., the publisher 102*b* of FIG. 1 and/or the publisher 408 of FIG. 4) does not identify a preference, the report generation circuitry (e.g., the report generation circuitry 116 of FIG. 1 and/or the report generation circuitry 406 of FIG. 4) generates the response in a default format.

The example API (e.g., the API 120 of FIG. 1 and/or the API 402 of FIG. 4) determines whether there is another API call (block 716). For example, the API (e.g., the API 120 of FIG. 1 and/or the API 402 of FIG. 4) waits for another API call from a publisher to detect demographic categories in substantially real-time. In some examples, if the API (e.g., the API 120 of FIG. 1 and/or the API 402 of FIG. 4) determines there is another API call (block 714: YES), control returns to block 702. In some examples, if the API (e.g., the API 120 of FIG. 1 and/or the API 402 of FIG. 4) determines there is not another API call (block 714: NO), the operations 700 end. In some examples, the example operations 700 may be repeated when the API (e.g., the API 120 of FIG. 1 and/or the API 402 of FIG. 4) receives a call from a publisher (e.g., the publisher 102*b* of FIG. 1 and/or the publisher 408 of FIG. 4) to detect who is accessing the media in substantially real-time.

Figure 8:
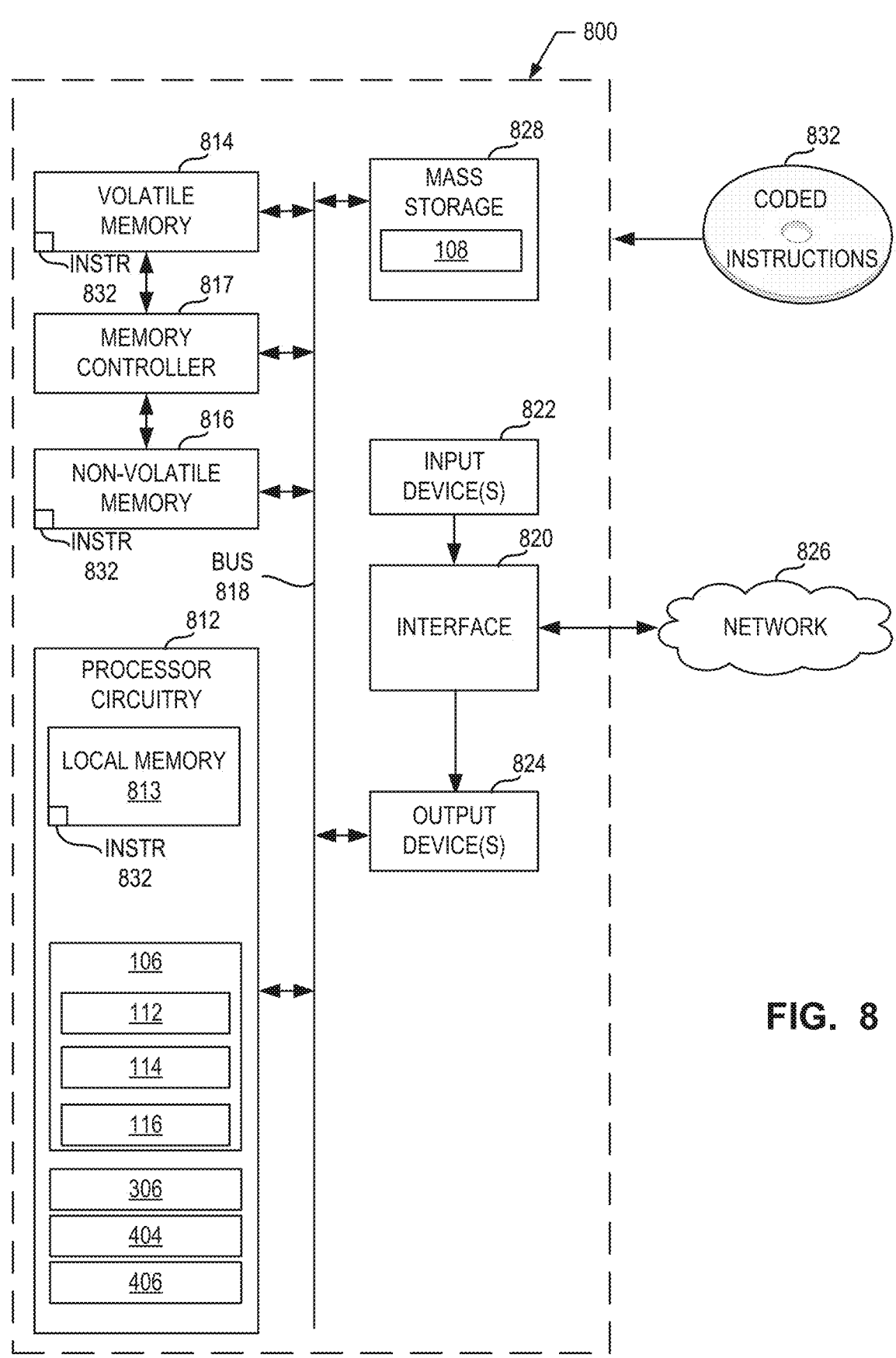
FIG. 8 is a block diagram of an example processing platform including processor circuitry structured to execute the example machine readable instructions and/or the example operations of FIGS. 6-7 to implement demographic assignment circuitry of FIG. 1.

FIG. 8 is a block diagram of an example processor platform 800 structured to execute and/or instantiate the machine readable instructions and/or the operations of FIGS. 6 and 7 to implement the demographic assignment circuitry 106 of FIG. 1. The processor platform 800 can be, for example, a server, a personal computer, a workstation, a self-learning machine (e.g., a neural network), a mobile device (e.g., a cell phone, a smart phone, a tablet such as an iPad™), an Internet appliance, or any other type of computing device.

The processor platform 800 of the illustrated example includes processor circuitry 812. The processor circuitry 812 of the illustrated example is hardware. For example, the processor circuitry 812 can be implemented by one or more integrated circuits, logic circuits, FPGAs, microprocessors, CPUs, GPUs, DSPs, and/or microcontrollers from any desired family or manufacturer. The processor circuitry 812 may be implemented by one or more semiconductor based (e.g., silicon based) devices. In this example, the processor circuitry 812 implements the example demographic assignment circuitry 106, the example household scoring circuitry 112, the example viewer assignment scoring circuitry 114, the example report generation circuitry 116, the example model 306, the example viewer assignment scoring circuitry 404, and the example report generation circuitry 406.

The processor circuitry 812 of the illustrated example includes a local memory 813 (e.g., a cache, registers, etc.). The processor circuitry 812 of the illustrated example is in communication with a main memory including a volatile memory 814 and a non-volatile memory 816 by a bus 818. The volatile memory 814 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 816 may be implemented by flash memory and/or any other desired type of memory device. Access to the main memory 814, 816 of the illustrated example is controlled by a memory controller 817.

The processor platform 800 of the illustrated example also includes interface circuitry 820. The interface circuitry 820 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 822 are connected to the interface circuitry 820. The input device(s) 822 permit(s) a user to enter data and/or commands into the processor circuitry 812. The input device(s) 822 can be implemented by, for example, an audio sensor, a microphone, a camera (still or video), a keyboard, a button, a mouse, a touchscreen, a track-pad, a trackball, an isopoint device, and/or a voice recognition system.

One or more output devices 824 are also connected to the interface circuitry 820 of the illustrated example. The output device(s) 824 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 820 of the illustrated example, thus, typically includes a graphics driver card, a graphics driver chip, and/or graphics processor circuitry such as a GPU.

The interface circuitry 820 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 826. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 800 of the illustrated example also includes one or more mass storage devices 828 to store software and/or data. Examples of such mass storage devices 828 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives. In this example, the one or more mass storage devices 828 implement the example model datastore 108 of FIG. 1.

The machine readable instructions 832, which may be implemented by the machine readable instructions of FIGS. 6-7, may be stored in the mass storage device 828, in the volatile memory 814, in the non-volatile memory 816, and/or on a removable non-transitory computer readable storage medium such as a CD or DVD.

Figure 9:
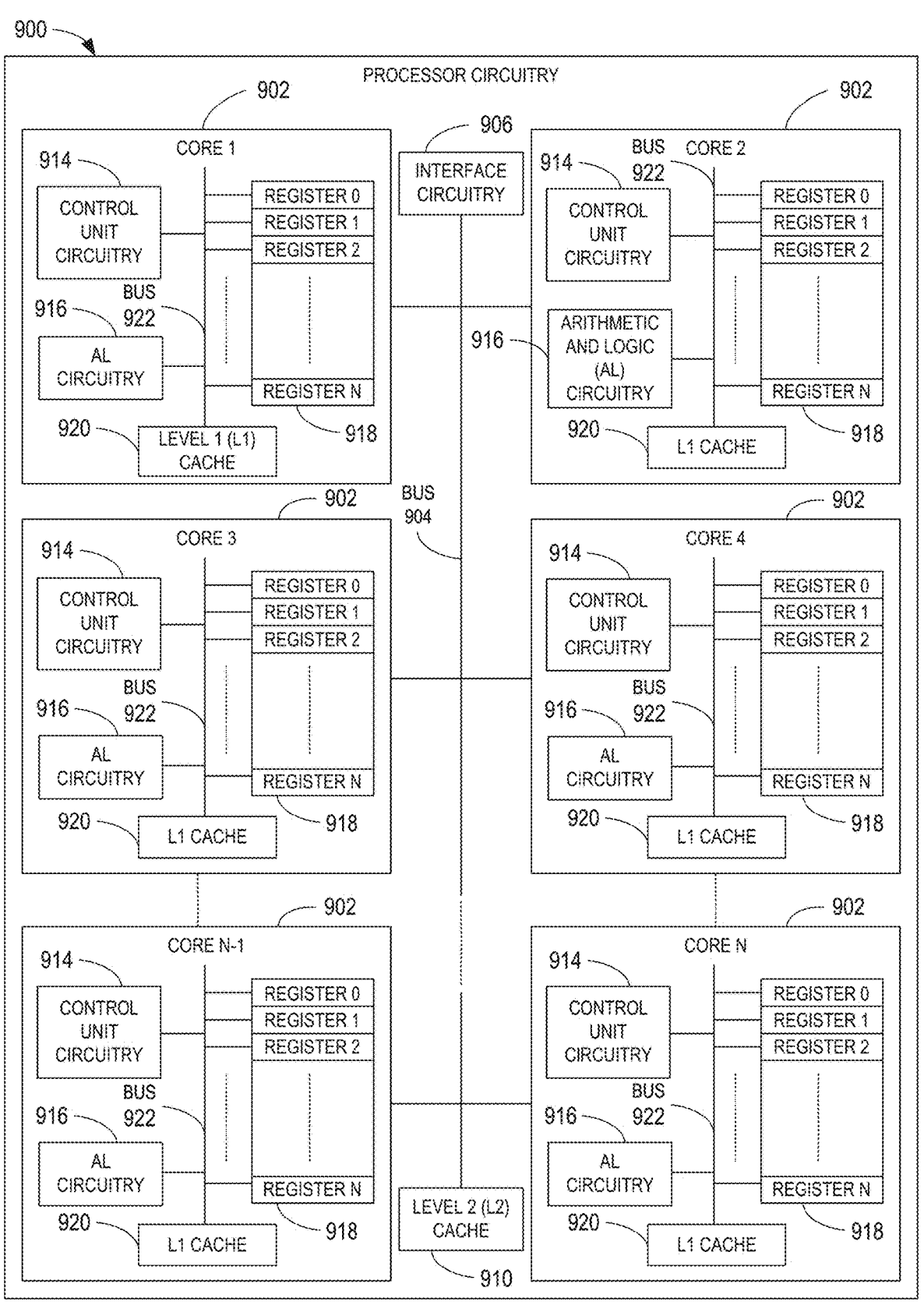
FIG. 9 is a block diagram of an example implementation of the processor circuitry of FIG. 8.

FIG. 9 is a block diagram of an example implementation of the processor circuitry 812 of FIG. 8. In this example, the processor circuitry 812 of FIG. 8 is implemented by a microprocessor 900. For example, the microprocessor 900 may be a general purpose microprocessor (e.g., general purpose microprocessor circuitry). The microprocessor 900 executes some or all of the machine readable instructions of the flowchart of FIGS. 6-7 to effectively instantiate the circuitry of FIGS. 1, 2, 3, and 4 as logic circuits to perform the operations corresponding to those machine readable instructions. In some such examples, the circuitry of FIGS. 1, 2, 3, and 4 is instantiated by the hardware circuits of the microprocessor 900 in combination with the instructions. For example, the microprocessor 900 may be implemented by multi-core hardware circuitry such as a CPU, a DSP, a GPU, an XPU, etc. Although it may include any number of example cores 902 (e.g., 1 core), the microprocessor 900 of this example is a multi-core semiconductor device including N cores. The cores 902 of the microprocessor 900 may operate independently or may cooperate to execute machine readable instructions. For example, machine code corresponding to a firmware program, an embedded software program, or a software program may be executed by one of the cores 902 or may be executed by multiple ones of the cores 902 at the same or different times. In some examples, the machine code corresponding to the firmware program, the embedded software program, or the software program is split into threads and executed in parallel by two or more of the cores 902. The software program may correspond to a portion or all of the machine readable instructions and/or operations represented by the flowchart of FIGS. 6-7.

The cores 902 may communicate by a first example bus 904. In some examples, the first bus 904 may be implemented by a communication bus to effectuate communication associated with one(s) of the cores 902. For example, the first bus 904 may be implemented by at least one of an Inter-Integrated Circuit (I2C) bus, a Serial Peripheral Interface (SPI) bus, a PCI bus, or a PCIe bus. Additionally or alternatively, the first bus 904 may be implemented by any other type of computing or electrical bus. The cores 902 may obtain data, instructions, and/or signals from one or more external devices by example interface circuitry 906. The cores 902 may output data, instructions, and/or signals to the one or more external devices by the interface circuitry 906. Although the cores 902 of this example include example local memory 920 (e.g., Level 1 (L1) cache that may be split into an L1 data cache and an L1 instruction cache), the microprocessor 900 also includes example shared memory 910 that may be shared by the cores (e.g., Level 2 (L2 cache)) for high-speed access to data and/or instructions. Data and/or instructions may be transferred (e.g., shared) by writing to and/or reading from the shared memory 910. The local memory 920 of each of the cores 902 and the shared memory 910 may be part of a hierarchy of storage devices including multiple levels of cache memory and the main memory (e.g., the main memory 814, 816 of FIG. 8). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 902 may be referred to as a CPU, DSP, GPU, etc., or any other type of hardware circuitry. Each core 902 includes control unit circuitry 914, arithmetic and logic (AL) circuitry (sometimes referred to as an ALU) 916, a plurality of registers 918, the local memory 920, and a second example bus 922. Other structures may be present. For example, each core 902 may include vector unit circuitry, single instruction multiple data (SIMD) unit circuitry, load/store unit (LSU) circuitry, branch/jump unit circuitry, floating-point unit (FPU) circuitry, etc. The control unit circuitry 914 includes semiconductor-based circuits structured to control (e.g., coordinate) data movement within the corresponding core 902. The AL circuitry 916 includes semiconductor-based circuits structured to perform one or more mathematic and/or logic operations on the data within the corresponding core 902. The AL circuitry 916 of some examples performs integer based operations. In other examples, the AL circuitry 916 also performs floating point operations. In yet other examples, the AL circuitry 916 may include first AL circuitry that performs integer based operations and second AL circuitry that performs floating point operations. In some examples, the AL circuitry 916 may be referred to as an Arithmetic Logic Unit (ALU). The registers 918 are semiconductor-based structures to store data and/or instructions such as results of one or more of the operations performed by the AL circuitry 916 of the corresponding core 902. For example, the registers 918 may include vector register(s), SIMD register(s), general purpose register(s), flag register(s), segment register(s), machine specific register(s), instruction pointer register(s), control register(s), debug register(s), memory management register(s), machine check register(s), etc. The registers 918 may be arranged in a bank as shown in FIG. 9. Alternatively, the registers 918 may be organized in any other arrangement, format, or structure including distributed throughout the core 902 to shorten access time. The second bus 922 may be implemented by at least one of an I2C bus, a SPI bus, a PCI bus, or a PCIe bus Each core 902 and/or, more generally, the microprocessor 900 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 900 is a semiconductor device fabricated to include many transistors interconnected to implement the structures described above in one or more integrated circuits (ICs) contained in one or more packages.

The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 10:
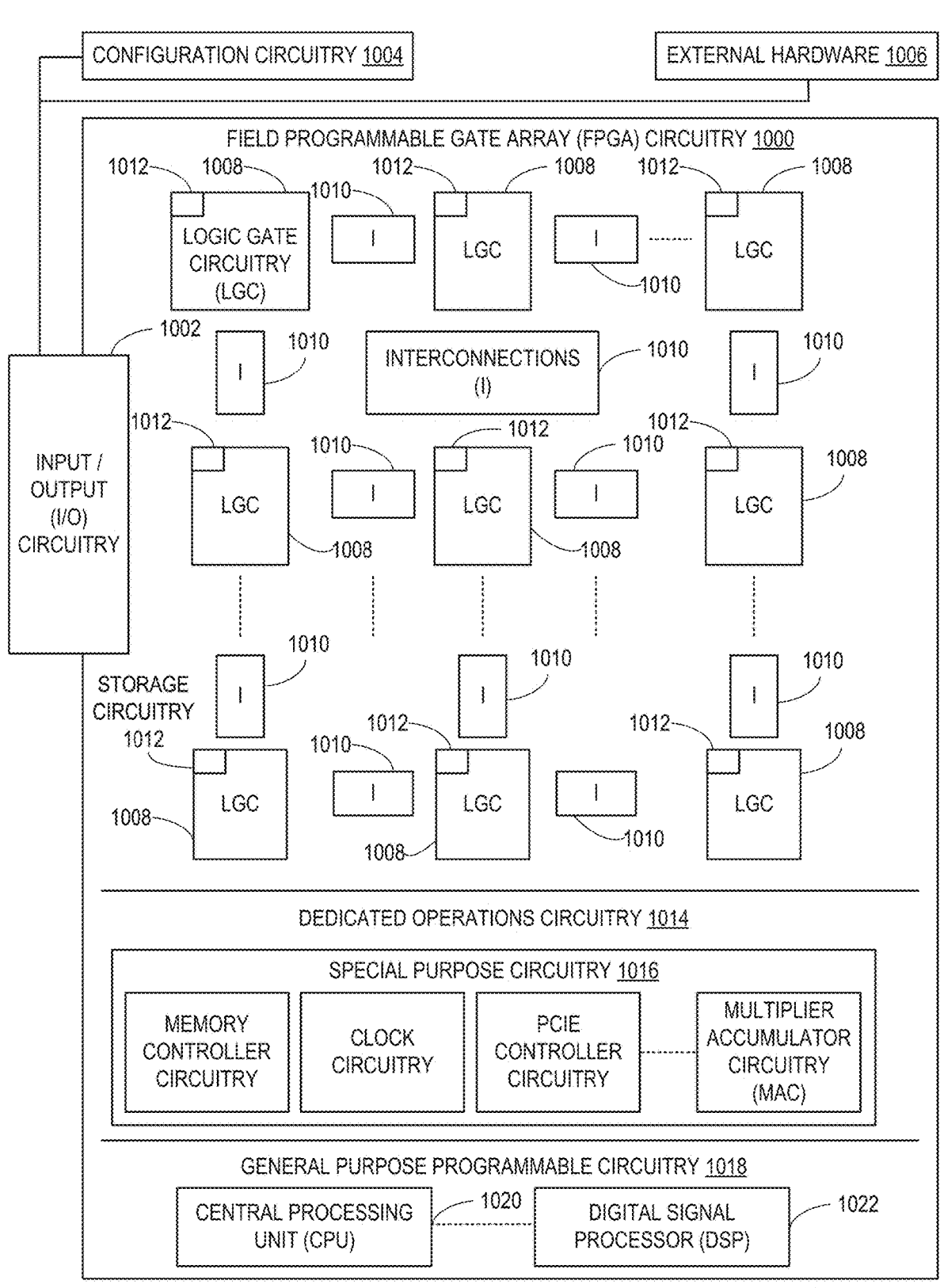
FIG. 10 is a block diagram of another example implementation of the processor circuitry of FIG. 8.

FIG. 10 is a block diagram of another example implementation of the processor circuitry 812 of FIG. 8. In this example, the processor circuitry 812 is implemented by FPGA circuitry 1000. For example, the FPGA circuitry 1000 may be implemented by an FPGA. The FPGA circuitry 1000 can be used, for example, to perform operations that could otherwise be performed by the example microprocessor 900 of FIG. 9 executing corresponding machine readable instructions. However, once configured, the FPGA circuitry 1000 instantiates the machine readable instructions in hardware and, thus, can often execute the operations faster than they could be performed by a general purpose microprocessor executing the corresponding software.

More specifically, in contrast to the microprocessor 900 of FIG. 9 described above (which is a general purpose device that may be programmed to execute some or all of the machine readable instructions represented by the flowcharts of FIGS. 6-7 but whose interconnections and logic circuitry are fixed once fabricated), the FPGA circuitry 1000 of the example of FIG. 10 includes interconnections and logic circuitry that may be configured and/or interconnected in different ways after fabrication to instantiate, for example, some or all of the machine readable instructions represented by the flowcharts of FIGS. 6-7. In particular, the FPGA circuitry 1000 may be thought of as an array of logic gates, interconnections, and switches. The switches can be programmed to change how the logic gates are interconnected by the interconnections, effectively forming one or more dedicated logic circuits (unless and until the FPGA circuitry 1000 is reprogrammed). The configured logic circuits enable the logic gates to cooperate in different ways to perform different operations on data received by input circuitry. Those operations may correspond to some or all of the software represented by the flowcharts of FIGS. 6-7. As such, the FPGA circuitry 1000 may be structured to effectively instantiate some or all of the machine readable instructions of the flowchart of FIGS. 6-7 as dedicated logic circuits to perform the operations corresponding to those software instructions in a dedicated manner analogous to an ASIC. Therefore, the FPGA circuitry 1000 may perform the operations corresponding to the some or all of the machine readable instructions of FIGS. 6-7 faster than the general purpose microprocessor can execute the same.

In the example of FIG. 10, the FPGA circuitry 1000 is structured to be programmed (and/or reprogrammed one or more times) by an end user by a hardware description language (HDL) such as Verilog. The FPGA circuitry 1000 of FIG. 10, includes example input/output (I/O) circuitry 1002 to obtain and/or output data to/from example configuration circuitry 1004 and/or external hardware 1006. For example, the configuration circuitry 1004 may be implemented by interface circuitry that may obtain machine readable instructions to configure the FPGA circuitry 1000, or portion(s) thereof. In some such examples, the configuration circuitry 1004 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1006 may be implemented by external hardware circuitry. For example, the external hardware 1006 may be implemented by the microprocessor 900 of FIG. 9. The FPGA circuitry 1000 also includes an array of example logic gate circuitry 1008, a plurality of example configurable interconnections 1010, and example storage circuitry 1012. The logic gate circuitry 1008 and the configurable interconnections 1010 are configurable to instantiate one or more operations that may correspond to at least some of the machine readable instructions of FIGS. 6-7 and/or other desired operations. The logic gate circuitry 1008 shown in FIG. 10 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1008 to enable configuration of the electrical structures and/or the logic gates to form circuits to perform desired operations. The logic gate circuitry 1008 may include other electrical structures such as look-up tables (LUTs), registers (e.g., flip-flops or latches), multiplexers, etc.

The configurable interconnections 1010 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1008 to program desired logic circuits.

The storage circuitry 1012 of the illustrated example is structured to store result(s) of the one or more of the operations performed by corresponding logic gates. The storage circuitry 1012 may be implemented by registers or the like. In the illustrated example, the storage circuitry 1012 is distributed amongst the logic gate circuitry 1008 to facilitate access and increase execution speed.

The example FPGA circuitry 1000 of FIG. 10 also includes example Dedicated Operations Circuitry 1014. In this example, the Dedicated Operations Circuitry 1014 includes special purpose circuitry 1016 that may be invoked to implement commonly used functions to avoid the need to program those functions in the field. Examples of such special purpose circuitry 1016 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1000 may also include example general purpose programmable circuitry 1018 such as an example CPU 1020 and/or an example DSP 1022. Other general purpose programmable circuitry 1018 may additionally or alternatively be present such as a GPU, an XPU, etc., that can be programmed to perform other operations.

Although FIGS. 9 and 10 illustrate two example implementations of the processor circuitry 812 of FIG. 8, many other approaches are contemplated. For example, as mentioned above, modern FPGA circuitry may include an onboard CPU, such as one or more of the example CPU 1020 of FIG. 10. Therefore, the processor circuitry 812 of FIG. 8 may additionally be implemented by combining the example microprocessor 900 of FIG. 9 and the example FPGA circuitry 1000 of FIG. 10. In some such hybrid examples, a first portion of the machine readable instructions represented by the flowcharts of FIGS. 6-7 may be executed by one or more of the cores 902 of FIG. 9, a second portion of the machine readable instructions represented by the flowcharts of FIGS. 6-7 may be executed by the FPGA circuitry 1000 of FIG. 10, and/or a third portion of the machine readable instructions represented by the flowcharts of FIGS. 6-7 may be executed by an ASIC. It should be understood that some or all of the circuitry of FIGS. 1, 2, 3, and 4 may, thus, be instantiated at the same or different times. Some or all of the circuitry may be instantiated, for example, in one or more threads executing concurrently and/or in series. Moreover, in some examples, some or all of the circuitry of FIGS. 1, 2, 3, and 4 may be implemented within one or more virtual machines and/or containers executing on the microprocessor.

In some examples, the processor circuitry 812 of FIG. 8 may be in one or more packages. For example, the microprocessor 900 of FIG. 9 and/or the FPGA circuitry 1000 of FIG. 10 may be in one or more packages. In some examples, an XPU may be implemented by the processor circuitry 812 of FIG. 8, which may be in one or more packages. For example, the XPU may include a CPU in one package, a DSP in another package, a GPU in yet another package, and an FPGA in still yet another package.

From the foregoing, it will be appreciated that example systems, methods, apparatus, and articles of manufacture have been disclosed that enables advertisers to make better decisions about placing ads in a CTV media delivery platform, increases precision of advertisement reach, enables media owners to optimize inventory and deliver improved results to advertisers, and improves efficiency of CTV buys. The disclosed systems, methods, apparatus, and articles of manufacture improve the efficiency of using a computing device such as a CTV by reducing and/or eliminating computational time that would otherwise be utilized to deliver wasted advertisements (e.g., ads not relevant or of no interest to persons accessing the ads). The disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to generate audience metrics for connected television are disclosed herein. Further examples and combinations thereof include the following:

Example 1 includes a system comprising at least one memory, programmable circuitry, and instructions to cause the programmable circuitry to obtain media access data corresponding to connected television media and a user identifier corresponding to a media access device, generate, using a machine learning model, probability values for corresponding audience demographics in a household composition corresponding to the user identifier, the probability values indicative of likelihoods that corresponding ones of the audience demographics are accessing the connected television media, determine a person-level characteristic based on the probability values of the audience demographics, the person-level characteristic corresponding to an audience member of the connected television media, and assign the media access data to the person-level characteristic.

Example 2 includes the system of example 1, wherein the programmable circuitry is to identify the household composition based on the user identifier, the household composition indicative of one or more demographic categories that use the media access device.

Example 3 includes the system of example 1, wherein the person-level characteristic includes at least one of an age or a gender.

Example 4 includes the system of example 1, wherein the programmable circuitry is to analyze historical media access data to determine the household composition associated with the media access device, the historical media access data generated during previous media access sessions presented by the media access device.

Example 5 includes the system of example 4, wherein the media access data is substantially real-time media access data and the programmable circuitry is to generate a mapping of the household composition with the user identifier, the mapping to subsequently generate the probability values based on the substantially real-time media access data and the user identifier.

Example 6 includes the system of example 1, wherein the programmable circuitry is to generate a report including the audience member of the connected television media, the report to provide substantially real-time feedback of the audience member to an advertiser.

Example 7 includes the system of example 1, wherein the programmable circuitry is to obtain an application programming interface call from a publisher of the connected television media, the application programming interface call indicative of second instructions to identify the audience member of the connected television media in substantially real-time.

Example 8 includes the system of example 1, wherein the programmable circuitry is to determine the person-level characteristic based on the person-level characteristic corresponding to a largest one of the probability values.

Example 9 includes the system of example 1, wherein the programmable circuitry is to generate, using a neural network, scores for demographic categories based on historical media access data, and compare the scores to a threshold to determine the household composition.

Example 10 includes a non-transitory machine readable storage medium comprising instructions that, when executed, cause processor circuitry to at least obtain media access data corresponding to connected television media and a user identifier corresponding to a media access device, generate, using a machine learning model, probability values for corresponding audience demographics in a household composition corresponding to the user identifier, the probability values indicative of likelihoods that corresponding ones of the audience demographics are accessing the connected television media, determine a person-level characteristic based on the probability values of the audience demographics, the person-level characteristic corresponding to an audience member of the connected television media, and assign the media access data to the person-level characteristic.

Example 11 includes the non-transitory machine readable storage medium of example 10, wherein the instructions are to cause the processor circuitry to identify the household composition based on the user identifier, the household composition indicative of one or more demographic categories that use the media access device.

Example 12 includes the non-transitory machine readable storage medium of example 10, wherein the person-level characteristic includes at least one of an age or a gender.

Example 13 includes the non-transitory machine readable storage medium of example 10, wherein the instructions are to cause processor circuitry to analyze historical media access data to determine the household composition associated with the media access device, the historical media access data generated during previous media access sessions presented by the media access device.

Example 14 includes the non-transitory machine readable storage medium of example 13, wherein the media access data is substantially real-time media access data and the instructions are to cause processor circuitry to generate a mapping of the household composition with the user identifier, the mapping to subsequently generate the probability values based on the substantially real-time media access data and the user identifier.

Example 15 includes the non-transitory machine readable storage medium of example 10, wherein the instructions are to cause processor circuitry to generate a report including the audience member of the connected television media, the report to provide substantially real-time feedback of the audience member to an advertiser.

Example 16 includes the non-transitory machine readable storage medium of example 10, wherein the instructions are to cause the processor circuitry to obtain an application programming interface call from a publisher of the connected television media, the application programming interface call indicative of second instructions to identify the audience member of the connected television media in substantially real-time.

Example 17 includes the non-transitory machine readable storage medium of example 10, wherein the instructions are to cause the processor circuitry to determine the person-level characteristic based on the person-level characteristic corresponding to a largest one of the probability values.

Example 18 includes the non-transitory machine readable storage medium of example 10, wherein the instructions are to cause the processor circuitry to generate, using a neural network, scores for demographic categories based on historical media access data, and compare the scores to a threshold to determine the household composition.

Example 19 includes an apparatus comprising viewer assignment scoring circuitry to obtain media access data corresponding to connected television media and a user identifier corresponding to a media access device, generate, using a machine learning model, probability values for corresponding audience demographics in a household composition corresponding to the user identifier, the probability values indicative of likelihoods that corresponding ones of the audience demographics are accessing the connected television media, determine a person-level characteristic based on the probability values of the audience demographics, the person-level characteristic corresponding to an audience member of the connected television media, and report generation circuitry to assign the media access data to the person-level characteristic.

Example 20 includes the apparatus of example 19, wherein the viewer assignment scoring circuitry is to identify the household composition based on the user identifier, the household composition indicative of one or more demographic categories that use the media access device.

Example 21 includes the apparatus of example 19, further including household scoring circuitry to analyze historical media access data to determine the household composition associated with the media access device, the historical media access data generated during previous media access sessions presented by the media access device.

Example 22 includes the apparatus of example 21, wherein the media access data is substantially real-time media access data and the household scoring circuitry is to generate a mapping of the household composition with the user identifier, the mapping to subsequently generate the probability values based on the substantially real-time media access data and the user identifier.

Example 23 includes the apparatus of example 19, wherein the report generation circuitry is to generate a report including the audience member of the connected television media, the report to provide substantially real-time feedback of the audience member to an advertiser.

Example 24 includes the apparatus of example 19, wherein the viewer assignment scoring circuitry is to obtain an application programming interface call from a publisher of the connected television media, the application programming interface call indicative of instructions to identify the audience member of the connected television media in substantially real-time.

Example 25 includes the apparatus of example 19, wherein the viewer assignment scoring circuitry is to determine the person-level characteristic based on the person-level characteristic corresponding to a largest one of the probability values.

Example 26 includes the apparatus of example 19, further including household scoring circuitry to generate, using a neural network, scores for demographic categories based on historical media access data, and compare the scores to a threshold to determine the household composition.

Example 27 includes a method comprising Obtaining, by executing an instruction with a processor, media access data corresponding to connected television media and a user identifier corresponding to a media access device, generating, using a machine learning model, probability values for corresponding audience demographics in a household composition corresponding to the user identifier, the probability values indicative of likelihoods that corresponding ones of the audience demographics are accessing the connected television media, determining, by executing an instruction with the processor, a person-level characteristic based on the probability values of the audience demographics, the person-level characteristic corresponding to an audience member of the connected television media, and assigning, by executing an instruction with the processor, the media access data to the person-level characteristic.

Example 28 includes the method of example 27, further including identifying the household composition based on the user identifier, the household composition indicative of one or more demographic categories that use the media access device.

Example 29 includes the method of example 27, further including analyzing historical media access data to determine the household composition associated with the media access device, the historical media access data generated during previous media access sessions presented by the media access device.

Example 30 includes the method of example 29, wherein the media access data is substantially real-time media access data and further including generating a mapping of the household composition with the user identifier, the mapping to subsequently generate the probability values based on the substantially real-time media access data and the user identifier.

Example 31 includes the method of example 27, further including generating a report including the audience member of the connected television media, the report to provide substantially real-time feedback of the audience member to an advertiser.

Example 32 includes the method of example 27, further including obtaining an application programming interface call from a publisher of the connected television media, the application programming interface call indicative of second instructions to identify the audience member of the connected television media in substantially real-time.

Example 33 includes the method of example 27, further including determining the person-level characteristic based on the person-level characteristic corresponding to a largest one of the probability values.

Example 34 includes the method of example 27, further including generating, using a neural network, scores for demographic categories based on historical media access data, and comparing the scores to a threshold to determine the household composition. The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. A computing system comprising:
a processor; and
at least one memory storing instructions that, when executed by the processor, cause the computing system to perform operations comprising:
obtaining a user identifier and media access data corresponding to a media presentation device, wherein the media access data characterizes media accessed by one or more users through the media presentation device;
obtaining, based on the user identifier, a device type of the media presentation device associated with the media access data, wherein the device type comprises a single-user device type or a multi-user device type;
providing as an input to a machine learning model, the media access data, the user identifier, and the device type;
processing the input using the machine learning model to generate a set of probability values for corresponding demographic categories in a household composition associated with the user identifier, wherein the probability values are numerical values, and wherein the probability values are indicative of probabilities that corresponding ones of the demographic categories were accessing the media characterized by the media access data; and
transmitting the set of probability values and the user identifier to a remote server, wherein transmitting is in response to determining whether the probability values are above a threshold.

2. The system of claim 1, wherein the operations further comprise:
selecting a target probability value from the set of probability values; and
generating a person-level characteristic based on the target probability value, wherein the person-level characteristic corresponds to a particular user associated with the media presentation device.

3. The system of claim 2, wherein the target probability value is the largest probability value from the set of probability values.

4. The system of claim 2, wherein the person-level characteristic comprises an age or a gender.

5. The system of claim 2, wherein the operations further comprise:
transmitting the person-level characteristic and the user identifier to the remote server.

6. The system of claim 1, wherein the machine learning model comprises a neural network configured to generate a respective probability value for each demographic category.

7. The system of claim 1, wherein the operations further comprise:

selecting one or more target probability values from the set of probability values, wherein the one or more target probability values comprise numerical values that are above the threshold; and assigning the demographic categories associated with the one or more target probability values to the user identifier to generate household composition parameters for the user identifier.

8. The system of claim 7, wherein the set of probability values is a first set of probability values, and wherein the operations further comprise:

obtaining real-time media access data corresponding to the media presentation device and the user identifier; and processing the real-time media access data, the device type, and the user identifier using the machine learning model to generate a second set of probability values that characterizes media accessed by the corresponding demographic categories in real-time, wherein the machine learning model is conditioned on the household composition parameters.

9. The system of claim 8, wherein the operations further comprise:

transmitting the second set of probability values and the user identifier to the remote server in real-time.

10. A non-transitory machine readable storage medium comprising instructions that, when executed, cause a processor to perform operations comprising:

obtaining a user identifier and media access data corresponding to a media presentation device, wherein the media access data characterizes media accessed by one or more users through the media presentation device;

obtaining, based on the user identifier, a device type of the media presentation device associated with the media access data, wherein the device type comprises a single-user device type or a multi-user device type;

providing as an input to a machine learning model, the media access data, the user identifier, and the device type;

processing the input using the machine learning model to generate a set of probability values for corresponding demographic categories in a household composition associated with the user identifier, wherein the probability values are numerical values, and wherein the probability values are indicative of probabilities that corresponding ones of the demographic categories were accessing the media characterized by the media access data; and transmitting the set of probability values and the user identifier to a remote server, wherein transmitting is in response to determining whether the probability values are above a threshold.

11. The non-transitory machine readable storage medium of claim 10, wherein the operations further comprise:

selecting a target probability value from the set of probability values; and generating a person-level characteristic based on the target probability value, wherein the person-level characteristic corresponds to a particular user associated with the media presentation device.

12. The non-transitory machine readable storage medium of claim 11, wherein the target probability value is the largest probability value from the set of probability values.

13. The non-transitory machine readable storage medium of claim 11, wherein the person-level characteristic comprises an age or a gender.

14. The non-transitory machine readable storage medium of claim 11, wherein the operations further comprise:

transmitting the person-level characteristic and the user identifier to the remote server.

15. The non-transitory machine readable storage medium of claim 10, wherein the machine learning model comprises a neural network configured to generate a respective probability value for each demographic category.

16. The non-transitory machine readable storage medium of claim 10, wherein the operations further comprise:

selecting one or more target probability values from the set of probability values, wherein the one or more target probability values comprise numerical values that are above the threshold; and assigning the demographic categories associated with the one or more target probability values to the user identifier to generate household composition parameters for the user identifier.

17. The non-transitory machine readable storage medium of claim 16, wherein the set of probability values is a first set of probability values, and wherein the operations further comprise:

obtaining real-time media access data corresponding to the media presentation device and the user identifier; and processing the real-time media access data, the device type, and the user identifier using the machine learning model to generate a second set of probability values that characterizes media accessed by the corresponding demographic categories in real-time, wherein the machine learning model is conditioned on the household composition parameters.

18. The non-transitory machine readable storage medium of claim 17, wherein the operations further comprise:

transmitting the second set of probability values and the user identifier to the remote server in real-time.

19. A method comprising:

obtaining a user identifier and media access data corresponding to a media presentation device, wherein the media access data characterizes media accessed by one or more users through the media presentation device;

obtaining, based on the user identifier, a device type of the media presentation device associated with the media access data, wherein the device type comprises a single-user device type or a multi-user device type;

providing as an input to a machine learning model, the media access data, the user identifier, and the device type;

processing the input using the machine learning model to generate a set of probability values for corresponding demographic categories in a household composition associated with the user identifier, wherein the probability values are numerical values, and wherein the probability values are indicative of probabilities that corresponding ones of the demographic categories were accessing the media characterized by the media access data; and transmitting the set of probability values and the user identifier to a remote server, wherein transmitting is in response to determining whether the probability values are above a threshold.

20. The method of claim 19, further comprising:

selecting a target probability value from the set of probability values; and generating a person-level characteristic based on the target probability value, wherein the person-level characteristic corresponds to a particular user associated with the media presentation device.

\* \* \* \* \*